United States Patent
Tsukuda et al.

(10) Patent No.: US 10,044,195 B2
(45) Date of Patent: Aug. 7, 2018

(54) ELECTRONIC DEVICE FOR COMMUNICATION

(71) Applicant: Renesas Electronics Corporation, Tokyo (JP)

(72) Inventors: Tatsuaki Tsukuda, Tokyo (JP); Hideki Sasaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 132 days.

(21) Appl. No.: 14/838,147

(22) Filed: Aug. 27, 2015

(65) Prior Publication Data

US 2016/0064823 A1  Mar. 3, 2016

(30) Foreign Application Priority Data

Aug. 29, 2014  (JP) .................. 2014-175192

(51) Int. Cl.
    *H01Q 1/12*   (2006.01)
    *H02J 5/00*   (2016.01)
    *H01Q 1/52*   (2006.01)
    *H01Q 7/00*   (2006.01)
    (Continued)

(52) U.S. Cl.
    CPC ............. *H02J 5/005* (2013.01); *H01Q 1/526* (2013.01); *H01Q 7/00* (2013.01); *H01Q 1/243* (2013.01); *H02J 50/70* (2016.02)

(58) Field of Classification Search
    None
    See application file for complete search history.

(56) References Cited

U.S. PATENT DOCUMENTS 7,212,124 B2   5/2007  Ohkawa et al.
8,618,997 B2  12/2013  Kato et al.
(Continued)

FOREIGN PATENT DOCUMENTS

JP   2004-227046 A   8/2004
JP   2005-234827 A   9/2005
(Continued)

OTHER PUBLICATIONS

Japanese Office Action, dated May 1, 2018, in Japanese Application No. 2014-175192 and English Translation thereof.

*Primary Examiner* — Trinh Dinh
(74) *Attorney, Agent, or Firm* — McGinn IP Law Group, PLLC.

(57) ABSTRACT

To achieve a reduction of noise in a wireless system of an electronic device for communication. The electronic device for communication includes: a bottom lid; a loop antenna that forms an electromagnetic field; a communication circuit coupled to the loop antenna; a battery pack that is a metallic part; a magnetic sheet arranged between the loop antenna and the metallic part, the magnetic sheet including a protruding portion that protrudes outside an outer peripheral portion of the loop antenna; a wiring substrate arranged over the battery pack and having an IC and the like mounted thereon; and a lid with a display arranged over the wiring substrate, in which, with the outer peripheral portion of the loop antenna as a base point, a protruding amount from the base point of the protruding portion of the magnetic sheet is twice or more a wiring width of the loop antenna.

20 Claims, 34 Drawing Sheets

(51) Int. Cl.
*H01Q 1/24* (2006.01)
*H02J 50/70* (2016.01)

(56) References Cited

U.S. PATENT DOCUMENTS

| | | | | |
|---|---|---|---|---|
| 8,933,846 B2* | 1/2015 | Nekozuka | ............... | H01Q 1/243 343/700 MS |
| 2005/0090299 A1* | 4/2005 | Tsao | ............... | H01Q 1/245 455/575.5 |
| 2005/0254183 A1* | 11/2005 | Ishida | ............... | H02J 17/00 361/18 |
| 2009/0085819 A1* | 4/2009 | Watanabe | ............... | H01Q 7/00 343/787 |
| 2010/0099365 A1* | 4/2010 | Aramaki | ............... | G06K 19/07771 455/73 |
| 2010/0163630 A1* | 7/2010 | Ochi | ............... | G06K 19/07732 235/492 |
| 2010/0270868 A1* | 10/2010 | Hanaoka | ............... | H01Q 1/2208 307/104 |
| 2010/0283698 A1* | 11/2010 | Orihara | ............... | G06K 19/07749 343/788 |
| 2011/0234014 A1* | 9/2011 | Kato | ............... | H01F 27/365 307/104 |
| 2013/0169398 A1* | 7/2013 | Sugita | ............... | H01Q 1/243 336/179 |
| 2014/0232335 A1* | 8/2014 | Tabata | ............... | H01F 27/365 320/108 |
| 2014/0306656 A1* | 10/2014 | Tabata | ............... | H01F 38/14 320/108 |
| 2014/0375262 A1* | 12/2014 | Yamaguchi | ............... | H02J 7/025 320/108 |
| 2015/0048985 A1* | 2/2015 | Park | ............... | H01Q 7/06 343/788 |
| 2015/0053772 A1* | 2/2015 | Holweg | ............... | G01N 33/00 235/492 |
| 2015/0333389 A1* | 11/2015 | Orihara | ............... | H01Q 1/2225 343/788 |
| 2016/0064814 A1* | 3/2016 | Jang | ............... | H01Q 1/526 343/842 |
| 2016/0156231 A1* | 6/2016 | Shibuya | ............... | H04B 5/0037 455/82 |

FOREIGN PATENT DOCUMENTS

| | | |
|---|---|---|
| JP | 2006-245950 A | 9/2006 |
| JP | 2007-110290 A | 4/2007 |
| JP | 2011-211309 A | 10/2011 |
| JP | 2013-070369 A | 4/2013 |
| JP | 2014-087188 A | 5/2014 |

* cited by examiner

ELECTRONIC DEVICE FOR COMMUNICATION

CROSS-REFERENCE TO RELATED APPLICATION

The disclosure of Japanese Patent Application No. 2014-175192 filed on Aug. 29, 2014 including the specification, drawings and abstract is incorporated herein by reference in its entirety.

BACKGROUND

The present invention relates to an electronic device for communication, and, for example, relates to a technique effectively applied to the electronic device for communication using a loop antenna that wirelessly transmits electric power.

BACKGROUND ART

For example, Japanese Patent Laid-Open No. 2014-87188 (Patent Literature 1) and Japanese Patent Laid-Open No. 2004-227046 (Patent Literature 2) disclose the structure of a portable device or portable information device.

SUMMARY

Problems to be Solved

Although a wireless power supply system has been developed for a portable (information) device such as a portable telephone, an antenna for wireless communication needs to be mounted in the information device, and a wiring substrate, a battery pack, and the like are inevitably arranged near the antenna for wireless communication.

The present inventor has found that in such a structure, due to the influence of the wiring substrate or the battery pack, the Q value ($=\omega L/R$) or resonant frequency of the antenna deviates, the antenna efficiency decreases, and furthermore the noise increases due to the interference with the wiring substrate.

Note that, Patent Literature 1 and Patent Literature 2 disclose a structure in which a battery or battery pack is arranged in the vicinity of a coil (antenna coil), but do not, in particular, refer to neither noise nor the influence thereof.

The other purposes and the new feature of the present invention will become clear from the description of the present specification and the accompanying drawings.

An electronic device for communication according to an embodiment includes: an antenna that forms an electromagnetic field; a communication circuit coupled to the antenna; a metallic part, at least a part of which includes a metal member; and a magnetic sheet arranged between the antenna and the metallic part, the magnetic sheet including a protruding portion that protrudes outside an outer peripheral portion of the antenna. Furthermore, in the electronic device for communication, with the outer peripheral portion of the antenna as a base point, a protruding amount from the base point of the protruding portion of the magnetic sheet is twice or more a wiring width of the antenna.

An electronic device for communication according to another embodiment includes: an antenna that forms an electromagnetic field; a communication circuit coupled to the antenna, a metallic part, at least a part of which includes a metal member; and a magnetic sheet arranged between the antenna and the metallic part, the size of which in a plan view is larger than a size of the antenna, in which a thickness of the magnetic sheet is 100 µm or more and 650 µm or less.

Effects of the Invention

According to the embodiment, a reduction of the noise in a wireless system of an electronic device for communication can be achieved.

DETAILED DESCRIPTION

In the following embodiments, the explanation of the same or similar portions is omitted, as a principle, unless otherwise particularly necessary.

The following embodiments will be explained, divided into plural sections or embodiments, if necessary for convenience. Except for the case where it shows clearly in particular, they are not mutually unrelated and one has relationships such as a modification, details, and supplementary explanation of some or entire of another.

In the following embodiments, when referring to the number of elements, etc. (including the number, a numeric value, an amount, a range, etc.), they may be not restricted to the specific number but may be greater or smaller than the specific number, except for the case where they are clearly specified in particular and where they are clearly restricted to a specific number theoretically.

Furthermore, in the following embodiments, it is needless to say that an element (including an element step etc.) is not necessarily indispensable, except for the case where it is clearly specified in particular and where it is considered to be clearly indispensable from a theoretical point of view, etc.

Moreover, in the following embodiments, when described as "comprises A", "comprising A", "having A", or "including A" with regard to an element or the like, it is needless to say that unless stated explicitly when "comprising only a specific element", elements other than this element are not excluded. Similarly, in the following embodiments, when shape, position relationship, etc. of an element etc. is referred to, what resembles or is similar to the shape substantially shall be included, except for the case where it is clearly specified in particular and where it is considered to be clearly not right from a theoretical point of view. This statement also applies to the numeric value and range described above.

Hereinafter, embodiments of the present invention will be described in detail with reference to the accompanying drawings. In all the drawings for explaining the embodiments, the same symbol is attached to a member having the same function, and the repeated explanation thereof is omitted. Furthermore, in order to make a drawing intelligible, hatching may be attached even if it is a plan view.

First Embodiment

Figure 1:
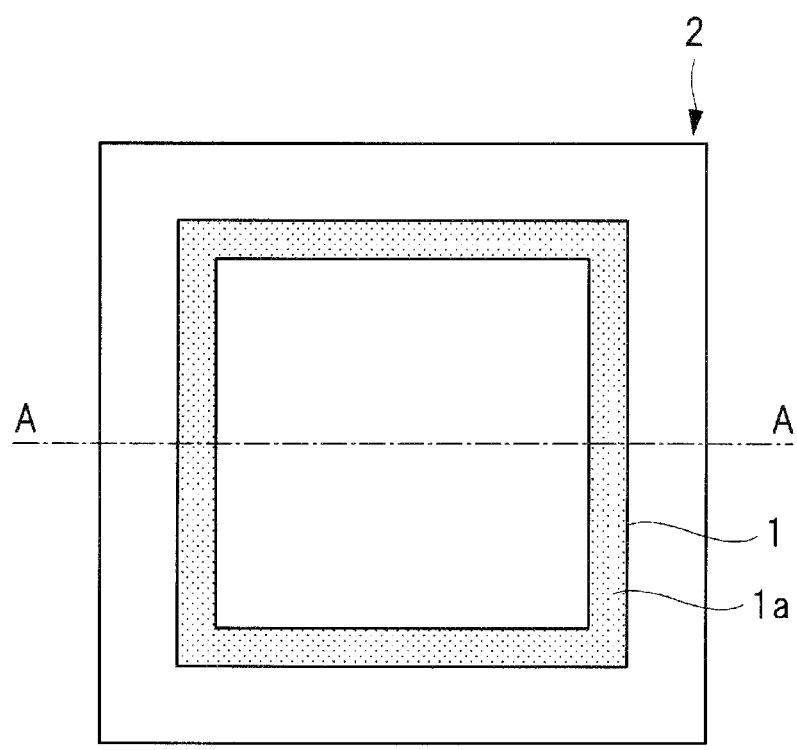
FIG. 1 is a plan view illustrating an example of a basic structure of a loop antenna and a magnetic sheet of a first embodiment.
Figure 2:
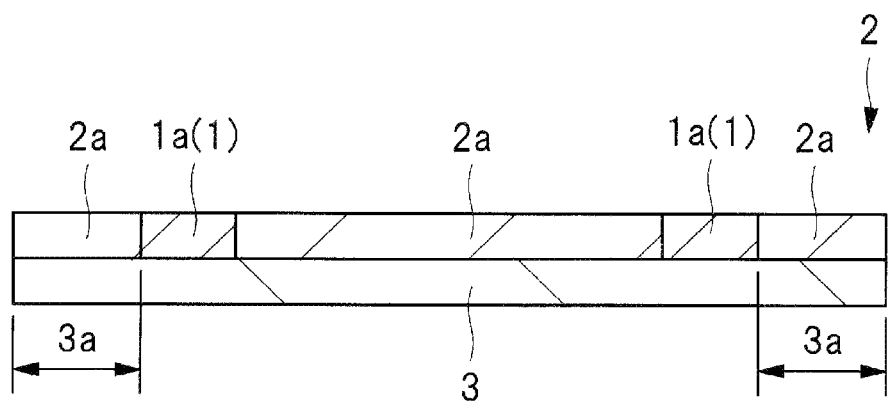
FIG. 2 is a cross-sectional view illustrating a structure of a cross section cut along an A-A line illustrated in FIG. 1.

FIG. 1 is a plan view illustrating an example of the basic structure of a loop antenna and a magnetic sheet of a first embodiment, and FIG. 2 is a cross-sectional view illustrating a structure of a cross section cut along an A-A line illustrated in FIG. 1.

A loop antenna (antenna) 1 of the first embodiment is used, for example, for a wireless power supply system in an electronic device for communication (portable terminal device) such as a portable telephone, and is used in the so-called "contactless power transmission".

However, it is needless to say that the loop antenna of the first embodiment may be used for another system that wirelessly transmits signals, except electric power.

The loop antenna 1 illustrated in FIG. 1 is formed in a resin substrate 2 such as a printed circuit board, by wiring and includes a frame-shaped antenna body 1a. In addition, an insulating film 2a of the resin substrate 2 is arranged around the outside and inside of the antenna body 1a.

Note that the resin substrate 2 such as a printed circuit board is constituted of a rigid substrate obtained by impregnating a glass fiber with, for example, an epoxy resin, a polyimide resin, a maleimide resin, or the like. Namely, the antenna (loop antenna 1) is constituted of a rigid substrate. A flexible substrate may be used in the case or the like where the efficiency between antennas is not affected.

In addition, a wire line may be used for the loop antenna 1. When a wire line is employed, any structure of a single line, twisted lines, and a Litz wire may be used as a structure of the wire line.

Furthermore, when the loop antenna 1 is formed by a wiring, the wiring is formed of, for example, copper (Cu), aluminum (Al), gold (Au), and the like. Moreover, in forming the loop antenna 1 by a wire line, the loop antenna 1 may be formed using a coating wire or the like obtained by covering the surface of a metal wire with an insulating resin.

In addition, as illustrated in FIG. 2, a magnetic sheet 3 is arranged on one side of the loop antenna 1. The magnetic sheet 3 is a thin sheet-shaped member formed of a magnetic material, and the size of the magnetic sheet 3 in a plan view is formed larger than the size of the loop antenna 1. Specifically, the magnetic sheet 3 includes a protruding portion 3a protruding outside the outer peripheral portion of the loop antenna 1, across the whole circumference thereof.

Note that the magnetic sheet 3 is formed by, for example, a tabular sintered-ferrite plate. In order to have flexibility, a configuration may be such that sintered ferrites broken into small pieces in advance are sandwiched by a resin sheet, a double-sided tape sheet, or the like. The sintered ferrite is effective in achieving a high shielding effect and/or a high efficiency because the ferrite can have a magnetic permeability higher than a soft magnetic sheet kneaded with magnetic powder.

A soft magnetic sheet may be used in the case or the like where there is no influence on efficiency. The soft magnetic sheet is constituted of a magnetic material and a resin, and flakes and/or powder of a soft magnetic material with a high permittivity are mixed into a plastic or the like to thereby form the sheet material. At that time, since magnetic powder is kneaded into a resin, the soft magnetic sheet is easily processed.

Next, the problem generated in the power supply system in the electronic device for communication of the first embodiment will be described using FIG. 3 to FIG. 9.

Figure 3:
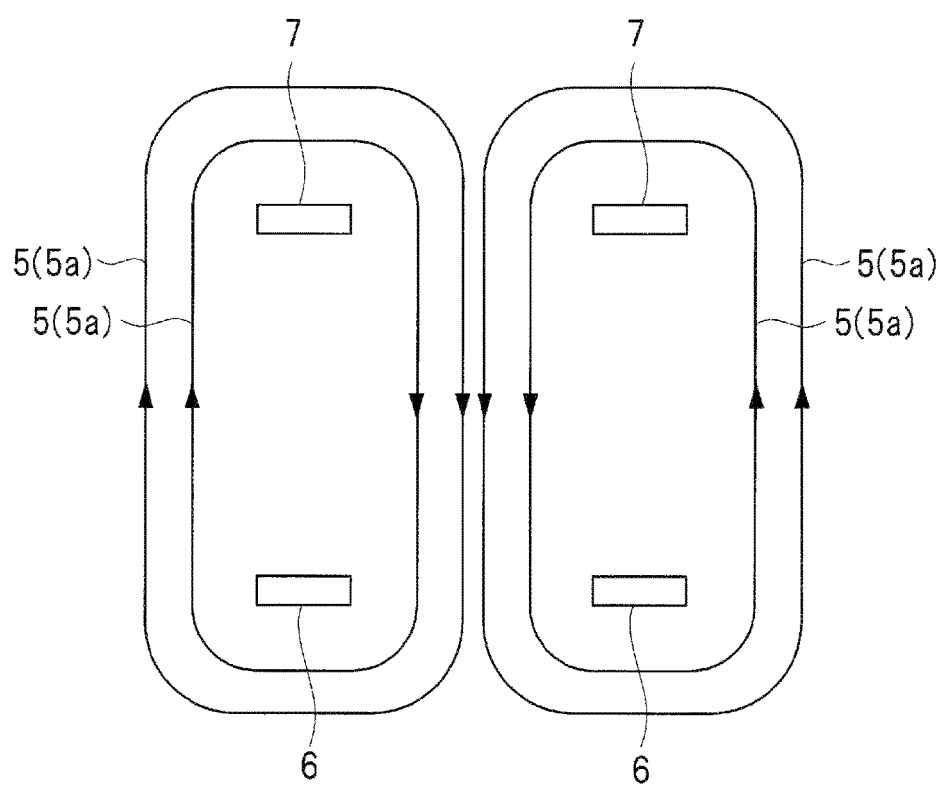
FIG. 3 is a schematic diagram illustrating an example of a magnetic field in a general power supply state of an electronic device for communication.
Figure 4:
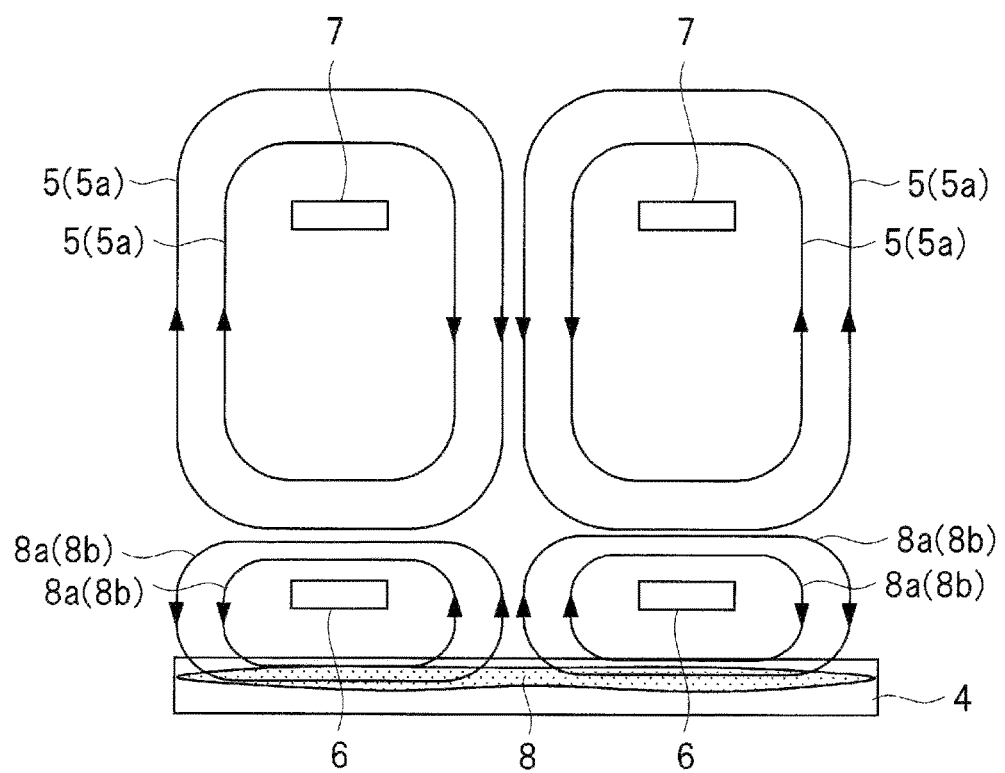
FIG. 4 is a schematic diagram illustrating a magnetic field in a non-power supply state.
Figure 5:
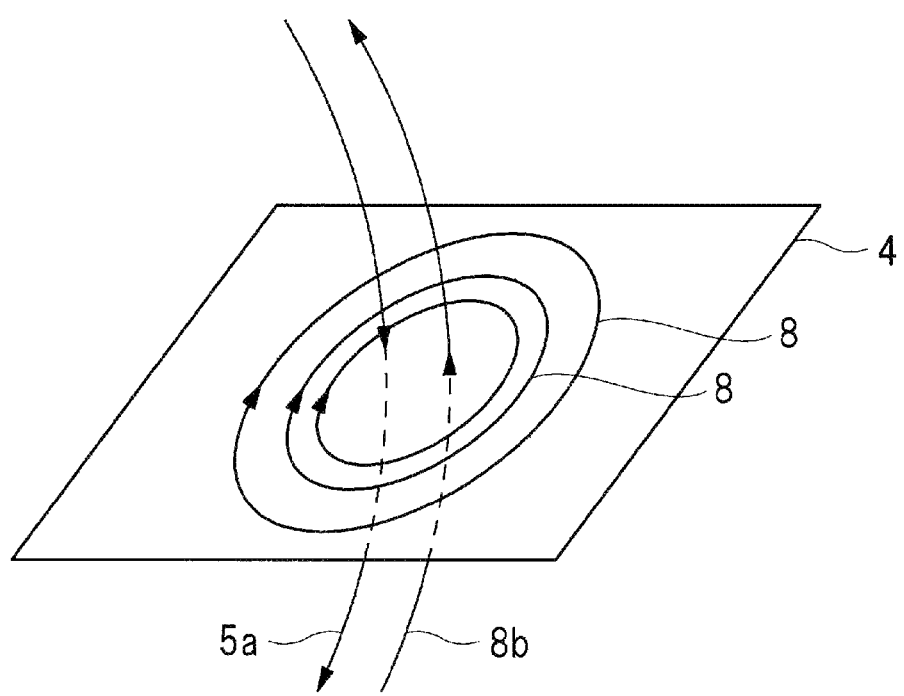
FIG. 5 is a schematic diagram illustrating a state of magnetic lines of force when an eddy current is generated.
Figure 6:
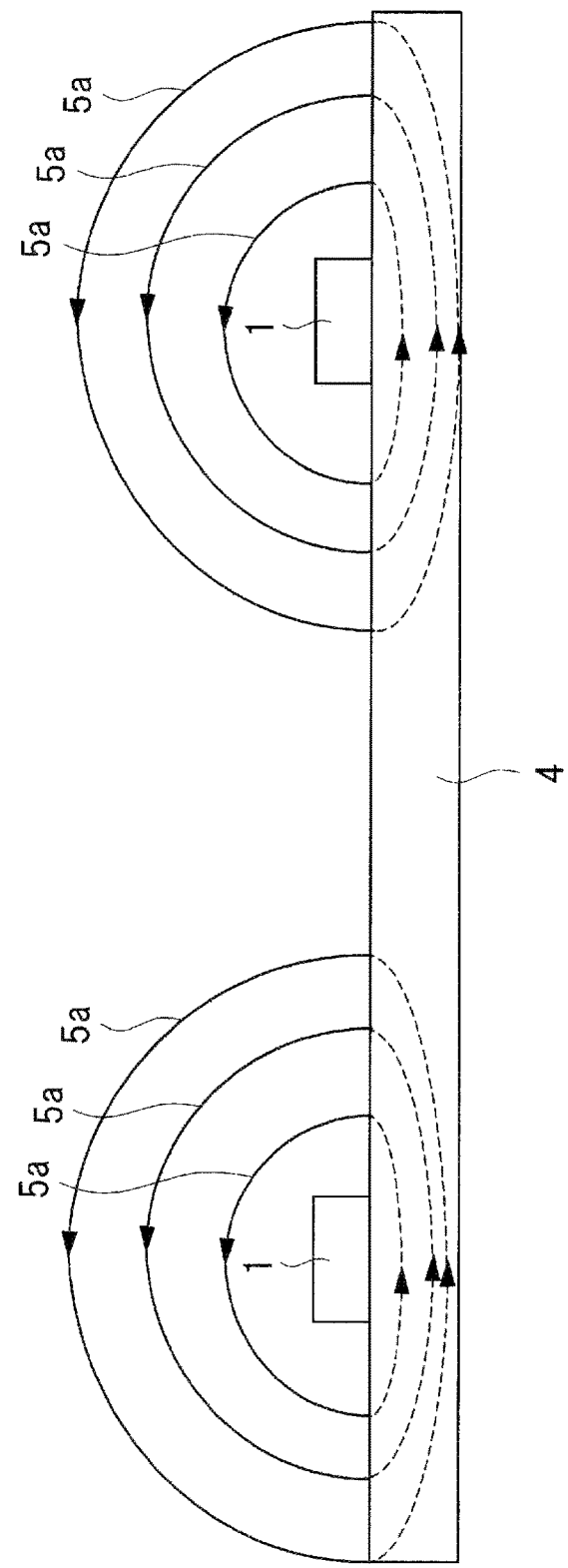
FIG. 6 is a schematic diagram illustrating a state of magnetic lines of force of an antenna when an eddy current is generated.
Figure 8:
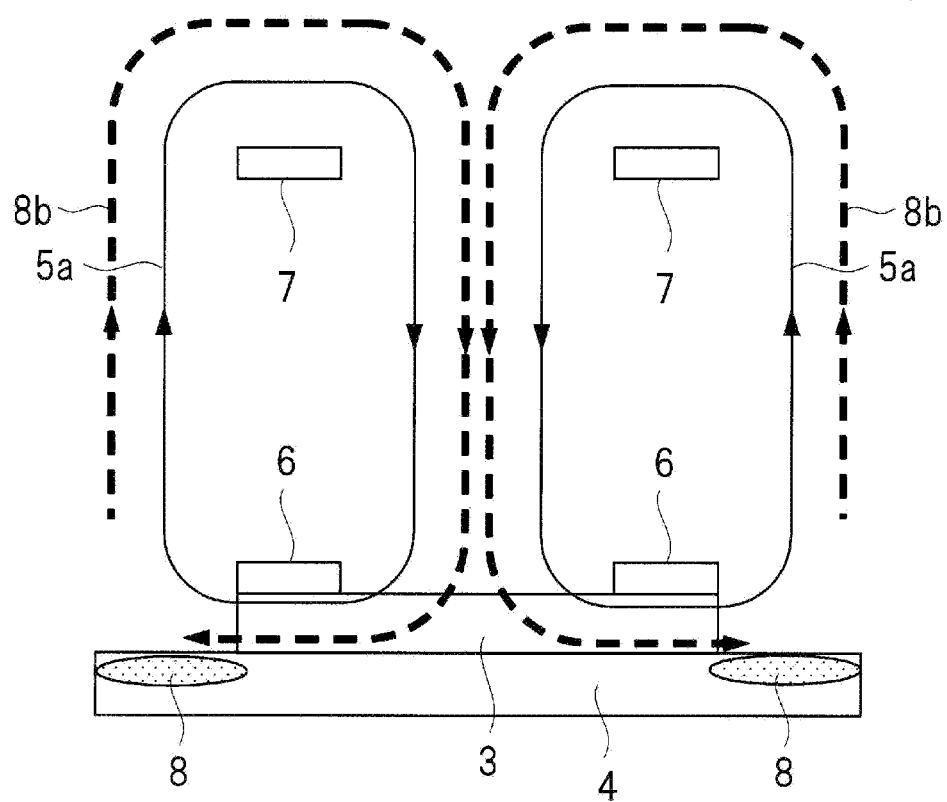
FIG. 8 is a schematic diagram illustrating a power supply state of a low efficiency when an eddy current is generated.
Figure 9:
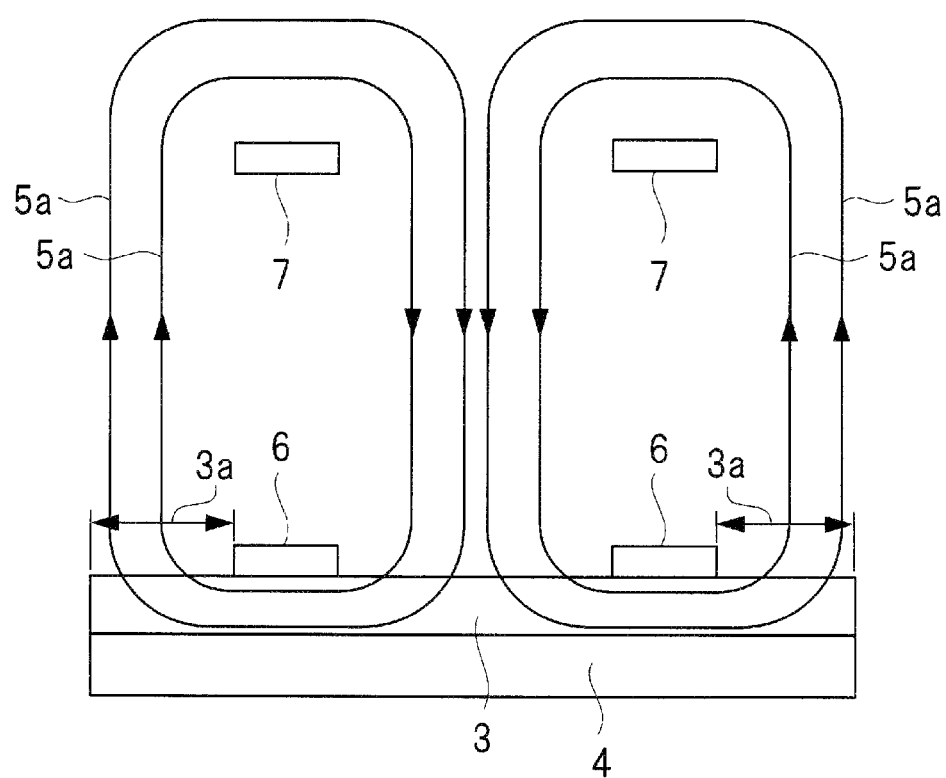
FIG. 9 is a schematic diagram illustrating a magnetic field of a power supply state of a high efficiency of the first embodiment.

FIG. 3 is a schematic diagram illustrating an example of a magnetic field in a general power supply state of the electronic device for communication, FIG. 4 is a schematic diagram illustrating a magnetic field in a non-power supply state, FIG. 5 is a schematic diagram illustrating a state of magnetic lines of force when an eddy current is generated, and FIG. 6 is a schematic diagram illustrating a state of magnetic lines of force of an antenna when an eddy current is generated. Furthermore, FIG. 7 is a schematic diagram illustrating a state of magnetic lines of force of an antenna when a magnetic sheet is provided, FIG. 8 is a schematic diagram illustrating a power supply state of a low efficiency when an eddy current is generated, and FIG. 9 is a schematic diagram illustrating a magnetic field of a power supply state of a high efficiency of the first embodiment.

As illustrated in FIG. 3, a power transmitting side loop antenna 6 and a power receiving side loop antenna 7 are arranged at a short distance from each other and an electromagnetic field 5 is formed so as to surround the both antennas, and thus power supply is successfully performed. However, as illustrated in FIG. 4, when a metallic part (hereinafter, will be described as a battery pack 4) of a substrate, battery pack, and the like is arranged near the loop antenna 1 (here, the power transmitting side loop antenna 6), an eddy current 8 is generated in the battery pack 4 due to electromagnetic induction. Then, as illustrated in FIG. 5, lines of magnetic force 8b generated by the eddy current 8 are formed so as to cancel the original lines of magnetic force 5a.

Namely, once the eddy current 8 is generated, the original lines of magnetic force 5a are weakened (dotted line part) as illustrated in FIG. 6. That is, as illustrated in FIG. 4, a demagnetizing field 8a is formed so as to surround the power transmitting side loop antenna 6 due to the eddy current 8 generated in the battery pack 4, resulting in a state of being unable to (non-power supply state).

Figure 7:
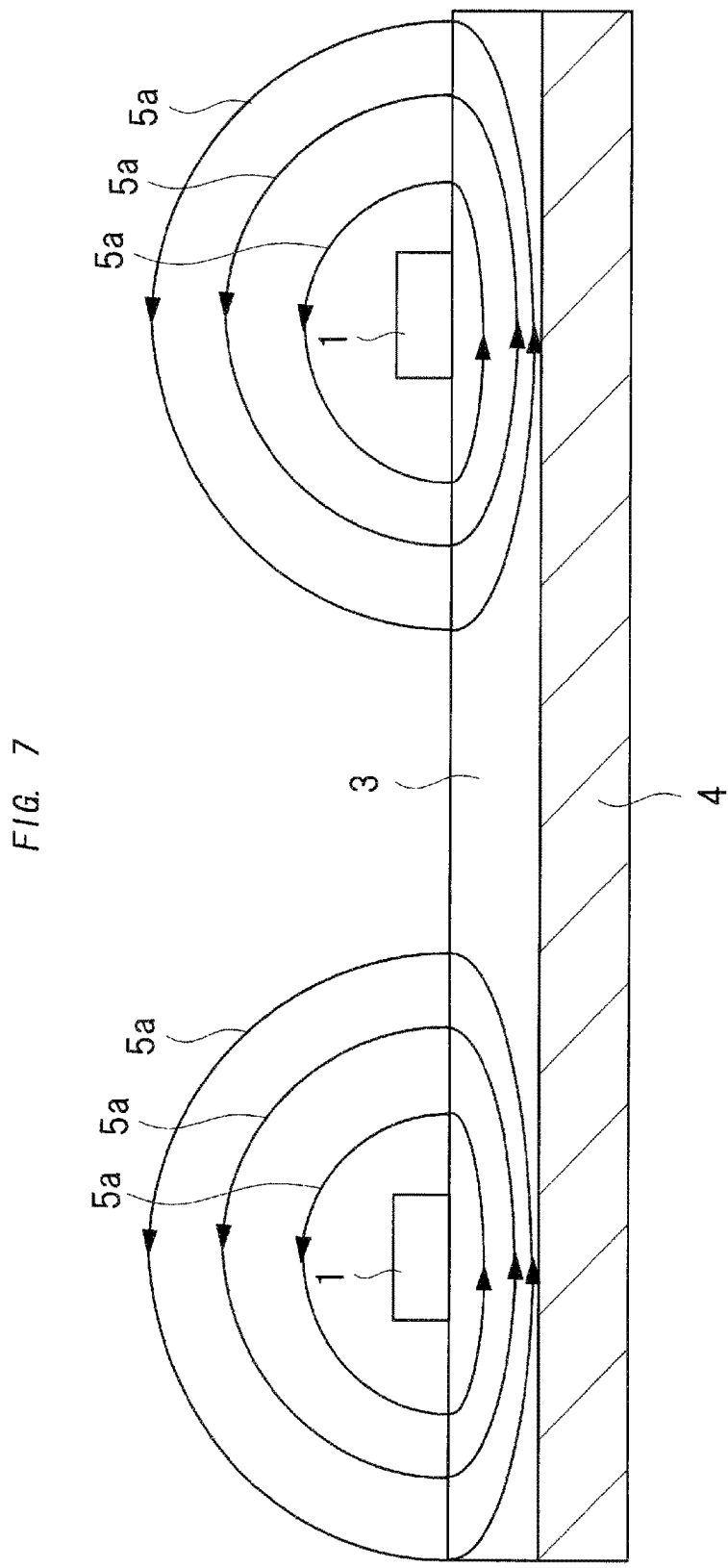
FIG. 7 is a schematic diagram illustrating a state of magnetic lines of force of an antenna when a magnetic sheet is provided.

Accordingly, as illustrated in FIG. 7, magnetic lines of force 5a can pass through the inside of the magnetic sheet 3, by arrangement of a magnetic sheet 3 directly under the antenna (here, the power transmitting side loop antenna 6 illustrated in FIG. 3), namely, between the power transmitting side loop antenna 6 and the battery pack 4. In other words, a path for magnetic fluxes is formed inside the magnetic sheet 3.

Thereby, the magnetic loss can be reduced. This is because the magnetic sheet 3 is formed of a material in which spins (something like small magnets) are likely to be aligned.

Accordingly, the interference of magnetic fields by the battery pack 4 is eliminated, which makes it possible to perform power supply.

Furthermore, as illustrated in FIG. 8, when an antenna such as the power receiving side loop antenna 7 or the power transmitting side loop antenna 6, has a size of the magnetic sheet 3 to be affected by the battery pack 4 that is a metallic part, e.g., when the outer shape of the antenna and the magnetic sheet 3 have the same size, the power supply efficiency decreases due to the influence of the demagnetizing field caused by the eddy current 8.

However, as with the first embodiment illustrated in FIG. 9, the size of the magnetic sheet 3 arranged between the antenna and the battery pack 4 is set larger than the size of the outer shape of the antenna, and thus a path for magnetic fluxes can be secured inside the magnetic sheet 3 and the interference from the battery pack 4 can be eliminated. At this time, as illustrated in FIG. 9, for example the size of the magnetic sheet 3 and the size of the battery pack 4 may be set to the same, and also in the case of the same size, the interference from the battery pack 4 can be eliminated.

Figure 10:
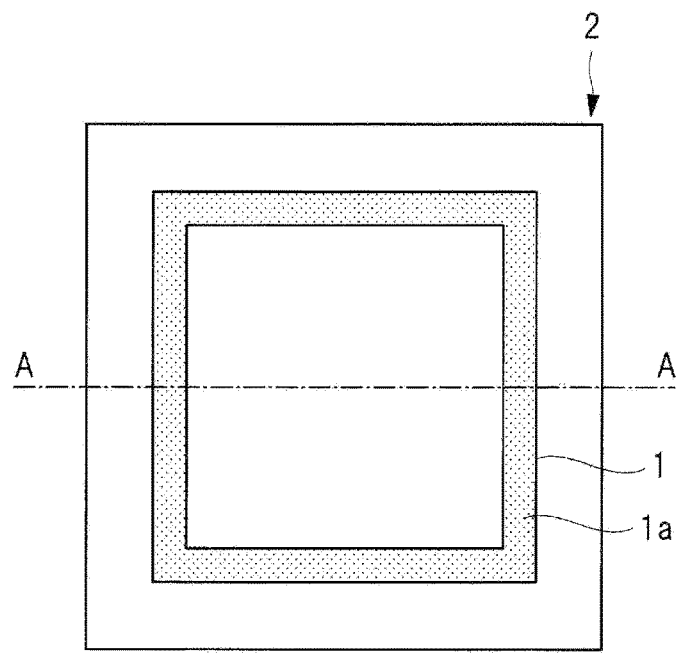
FIG. 10 is a plan view illustrating an example of the basic structure when the loop antenna, the magnetic sheet, and a battery pack of the first embodiment are stacked.
Figure 11:
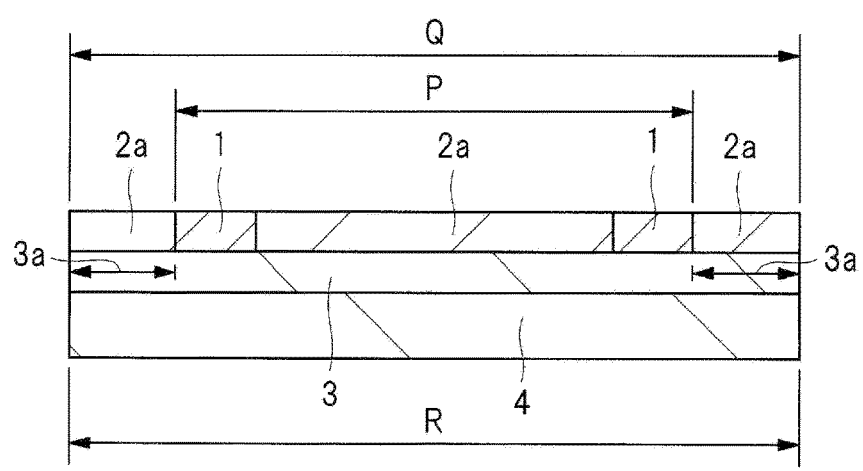
FIG. 11 is a cross-sectional view illustrating a structure of a cross section cut along an A-A line illustrated in FIG. 10.

Here, FIG. 10 is a plan view illustrating an example of the basic structure when the loop antenna, the magnetic sheet, and the battery pack of the first embodiment are stacked, and FIG. 11 is a cross-sectional view illustrating a structure of a cross section cut along an A-A line illustrated in FIG. 10.

In the structure illustrated in FIG. 10 and FIG. 11, a configuration is such that the loop antenna 1 is arranged over the magnetic sheet 3 and the magnetic sheet 3 has a size equal to or greater than the size of the outer shape of the loop antenna 1. Namely, the magnetic sheet 3 is constituted in a size large enough to be able to block the influence of a metallic part of the substrate, battery pack 4, or the like under the magnetic sheet 3.

Here, FIG. 11 illustrates a relationship between an outer length P in the width direction of the loop antenna 1 formed in the resin substrate (rigid substrate) 2, a length Q of the outer shape in the width direction of the magnetic sheet 3, and an outer length R in the width direction of the battery pack 4, in which the length Q of the magnetic sheet 3 satisfies Q>P. Furthermore, the length Q of the outer shape of the magnetic sheet 3 may satisfy Q=R>P, or may satisfy Q>R>P, or may satisfy R>Q>P.

Next, a relationship among the thickness, magnetic permeability, and magnetic loss in the magnetic sheet 3 will be described.

Figure 12:
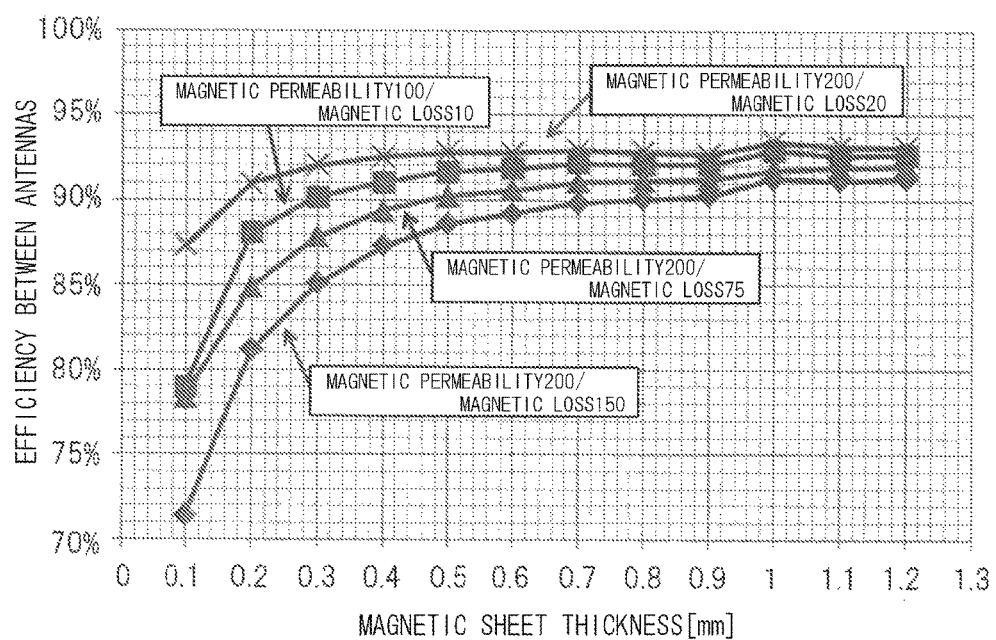
FIG. 12 is a graph illustrating a relationship between a thickness of the magnetic sheet and efficiency between antennas of the first embodiment.
Figure 13:
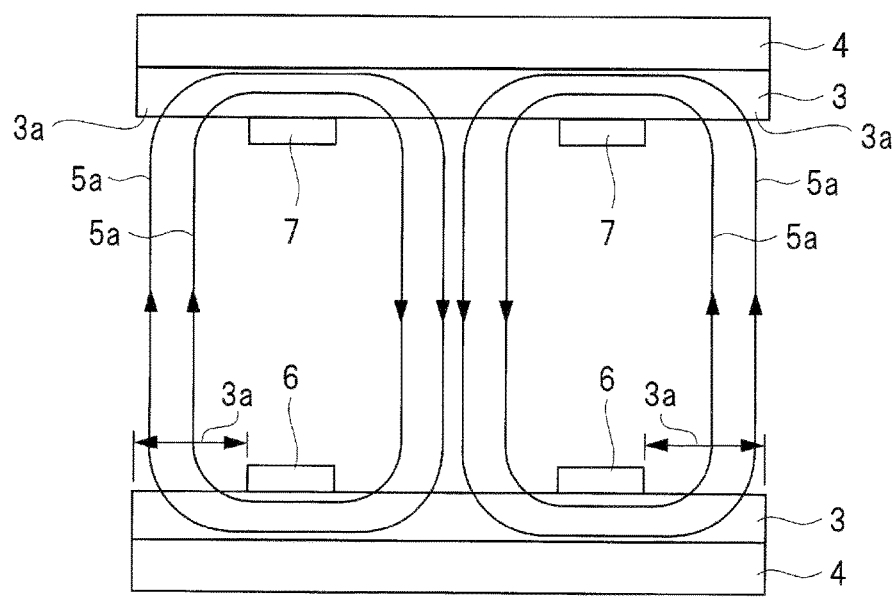
FIG. 13 is a schematic diagram illustrating the magnetic field in a power supply state of the first embodiment.

FIG. 12 is a graph illustrating, by simulation, a relationship between the thickness of the magnetic sheet and efficiency between antennas of the first embodiment, and FIG. 13 is a schematic diagram illustrating the magnetic field in a power supply state of the first embodiment.

First, according to the characteristics of the magnetic sheet 3, the efficiency between antennas increases as the thickness of the magnetic sheet 3 becomes larger. In addition, the efficiency between antennas increases as the magnetic permeability of the magnetic sheet 3 becomes larger. Furthermore, the efficiency between antennas increases as the magnetic loss of the magnetic sheet 3 decreases. Moreover, when the magnetic loss is the same, the higher the magnetic permeability, the higher the efficiency between antennas becomes.

The following will be revealed from FIG. 12.

The simulation results illustrated in FIG. 12 are obtained, as illustrated in FIG. 13, in the case where the magnetic sheet 3 is mounted between the opposing antennas (the power transmitting side loop antenna 6 and the power receiving side loop antenna 7) and the metallic part (battery pack 4) arranged on the opposite side thereof, respectively. Namely, in the structure illustrated in FIG. 13, the metal (battery pack 4), the magnetic sheet 3, the power receiving side loop antenna 7, a space, the power transmitting side loop antenna 6, the magnetic sheet 3, and metal (battery pack 4) are arranged in this order.

At this time, in FIG. 12, for example, when the efficiency of 90% or more is targeted using the magnetic sheet 3 having a magnetic permeability of 200 and a magnetism loss of 75, the magnetic sheet thickness (the thickness of the magnetic sheet 3) becomes 0.5 mm or more. This 0.5 mm is specified from a change point in which the efficiency becomes flat from rising.

Since the loop antenna 1 and magnetic sheet 3 of the first embodiment are mounted in, for example, an electronic device for communication, such as a portable telecommunication device (mobile device), the thickness of the magnetic sheet 3 is preferably thinner. However, when the thickness is too thin, the possibility of damage is increased, with the result that the magnetic sheet 3 requires robustness (rigidity).

On the other hand, when the magnetic sheet 3 is too thin, the flatness of the magnetic sheet 3 deteriorates and the Q value and efficiency of the antenna change, with the result that a certain thickness enough to be able to secure the flatness is required. In addition, in the magnetic sheet 3, the higher the magnetic permeability is, the more easily a magnetic flux passes therethrough, and thus the magnetic sheet 3 having a higher magnetic permeability has a higher shielding effect. In addition, the magnetic sheet 3 having a smaller magnetic loss has a higher shielding effect.

Accordingly, a material that tends to have a larger magnetic permeability and a smaller magnetic loss is preferably selected as the material of the magnetic sheet 3. A path for magnetic fluxes is formed inside the magnetic sheet 3 as illustrated in FIG. 13, by selecting such a material, and thus the interference of magnetic fields by the battery pack 4 is eliminated, which makes it possible to supply power.

Namely, the magnetic sheet 3 having a desired thickness that depends on the magnetic permeability and magnetic loss is attached to the loop antenna 1, and the size of the outer shape of the magnetic sheet 3 is set larger than the size of the outer shape of the loop antenna 1, and thus the influence of a metallic part of the substrate, the battery pack 4, or the like can be shut off. For example, in a case of the magnetic permeability of 100 and the magnetic loss of 0.1, the thickness of the magnetic sheet 3 is set 0.5 mm or more. As a result, the magnetic field and electric field formed around the antenna can be made uniform, and thus the common mode current decreases and the radiation noise can be suppressed.

Therefore, a state of supplying electric power is reached by the power transmitting side loop antenna 6 and the power receiving side loop antenna 7.

Figure 14:
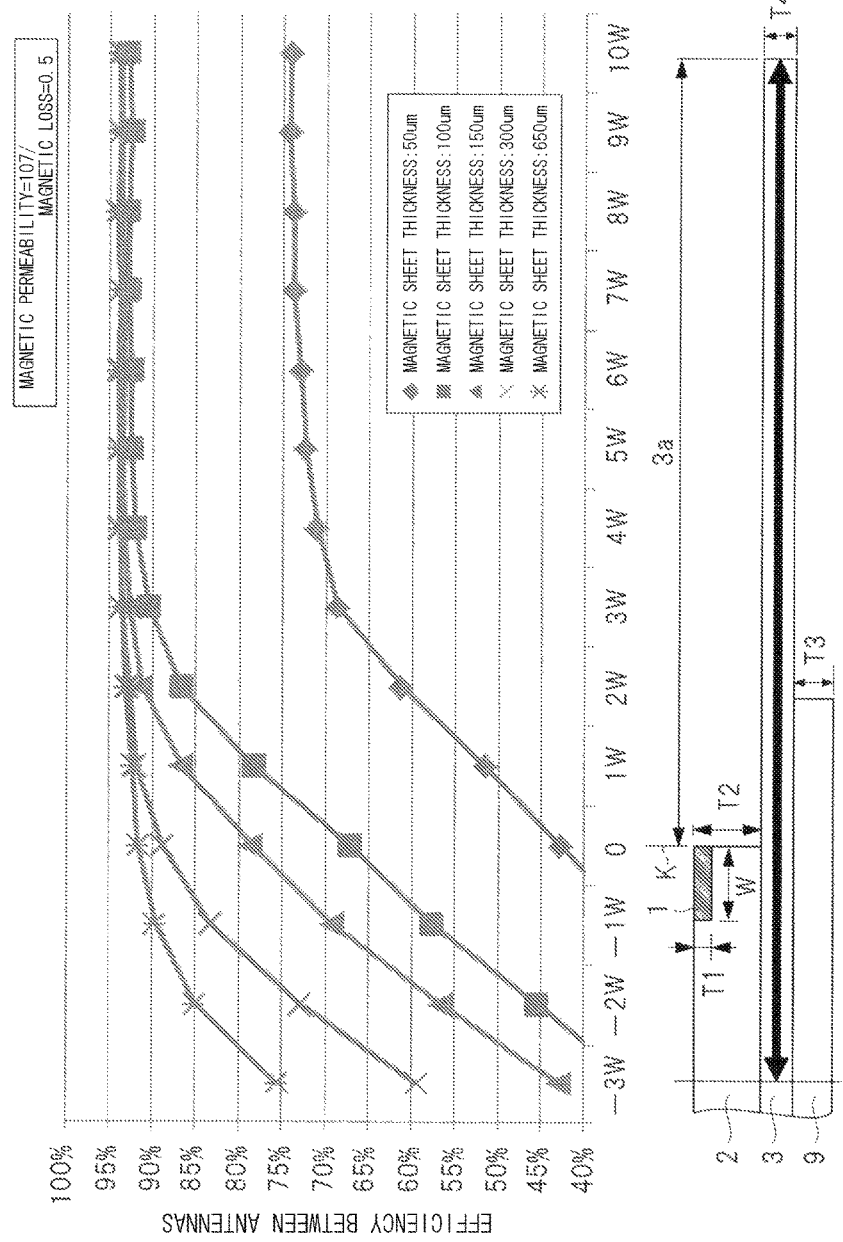
FIG. 14 is a graph illustrating a relationship between the thickness of the magnetic sheet and an efficiency between antennas of the first embodiment and a relationship between the protruding amount of the magnetic sheet from the antenna and the efficiency between antennas.

Next, a range of the protruding amount of the protruding portion 3a that protrudes from the outer peripheral portion (a base point K) of the antenna of the magnetic sheet 3 across the whole circumference will be described using FIG. 14. FIG. 14 is a graph illustrating a relationship between the thickness of the magnetic sheet and the efficiency between antennas of the first embodiment and a relationship between the protruding amount of the magnetic sheet from the antenna and the efficiency between antennas.

Note that, in FIG. 14, the edge of the outer peripheral portion of the loop antenna 1 is defined as the base point K and the width of the loop antenna 1 is designated by W, and for each thickness of the magnetic sheet 3, the protruding amount of the protruding portion 3a from the outer peripheral portion of the antenna of the magnetic sheet 3 is expressed in the unit of the width W of the loop antenna 1. Here, the thickness of the loop antenna 1 is designated by T1, the thickness of the resin substrate 2 is designated by T2, the thickness of the metal plate (the sheet member corresponding to the battery pack 4 or the like) 9 as a metallic part is designated by T3, and the thickness of the magnetic sheet 3 is designated by T4.

Furthermore, the simulation of FIG. 14 was performed, with the magnetic permeability of the magnetic sheet 3 having the respective thicknesses being set to 107 and the magnetic loss thereof being set to 0.5.

According to FIG. 14, in the thickness T4 of the magnetic sheet 3 of 100 μm or more, the efficiency between antennas can be made 85% or more by setting the protruding amount of the protruding portion 3a from the loop antenna 1 of the magnetic sheet 3 to twice or more the width (wiring width) W of the loop antenna 1. Note that the efficiency between antennas is ideally 100%, but usually 85% or more, and preferably 90% or more.

Namely, in order for the efficiency between antennas to be 90% or more, in the case where the thickness of the magnetic sheet (also referred to as the magnetic sheet) 3 is 100 μm, the protruding amount of the protruding portion 3a of the magnetic sheet 3 should be set to three times or more the width W of the loop antenna 1. That is, the protruding amount, from the loop antenna 1, of the magnetic sheet 3 is preferably set to three times or more the width (wiring width) W of the loop antenna 1, and in this case, the influence of the metal plate (metallic part) 9 can be neglected.

However, when the efficiency between antennas can be set 85% or more, the protruding amount, from the loop antenna 1, of the magnetic sheet 3 may be set to twice or more the width (wiring width) W of the loop antenna 1.

Furthermore, as the magnetic sheet 3 becomes thicker, the efficiency between antennas tends to increase regardless of the magnitude of the width W of the antenna. Accordingly, the thicker the magnetic sheet 3, the smaller the size of the outer shape of the magnetic sheet 3 can be made.

Therefore, the number of obtained magnetic sheets 3 in forming the magnetic sheet 3 can be increased and a reduction in cost can be achieved, by reducing the area of the magnetic sheet 3 in a plan view. Furthermore, a reduction in weight of the magnetic sheet 3 can be achieved.

Note that the upper limit of the thickness of the magnetic sheet 3 is 650 μm, and accordingly a range of the thickness of the magnetic sheet 3 is 100 μm or more and 650 μm or less.

Moreover, regarding the protruding amount from the loop antenna 1 of the magnetic sheet 3, since the efficiency between antennas exhibits a constant value (saturation) in the vicinity 5W in the horizontal axis of the graph illustrated in FIG. 14 in which the width of the antenna is W, the upper limit of the protruding amount of the magnetic sheet 3 is set to five times the width W of the loop antenna 1. Accordingly, a range of the protruding amount of the magnetic sheet 3 is twice or more and five times or less the width W of the loop antenna 1, preferably three times or more or more times and five times or less.

Next, the electronic device for communication of the first embodiment will be described.

Figure 15:
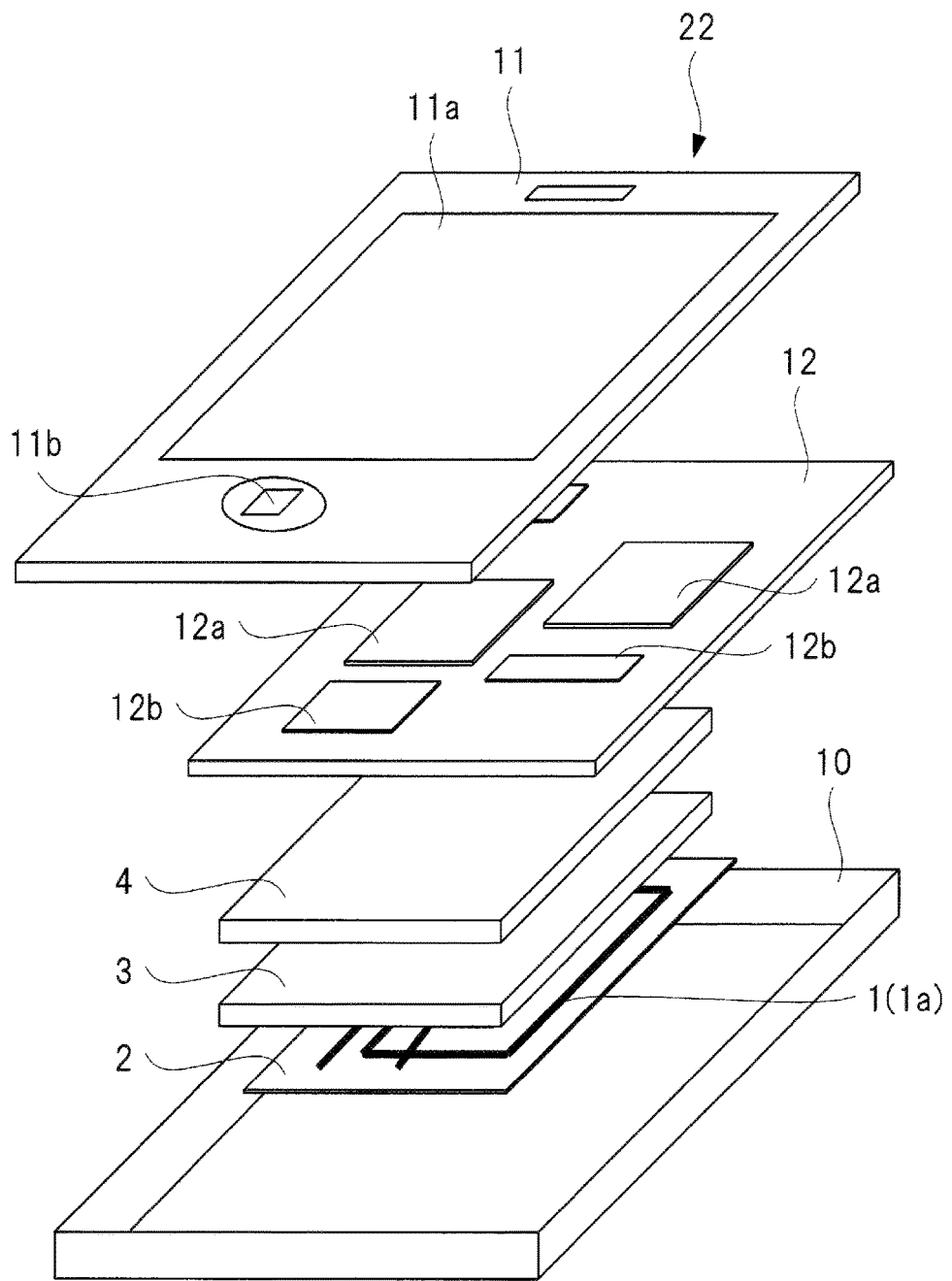
FIG. 15 is a perspective view illustrating an example of the internal structure of the electronic device for communication of the first embodiment.
Figure 16:
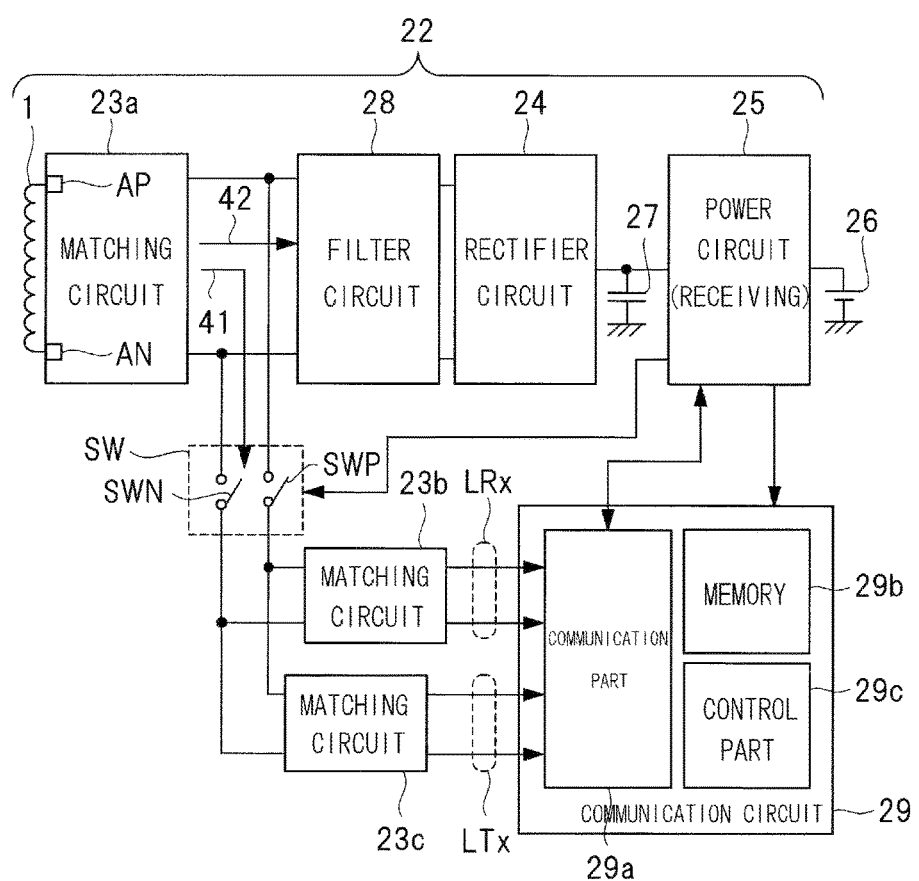
FIG. 16 is a configuration block diagram of components mounted over a wiring substrate illustrated in FIG. 15.
Figure 17:
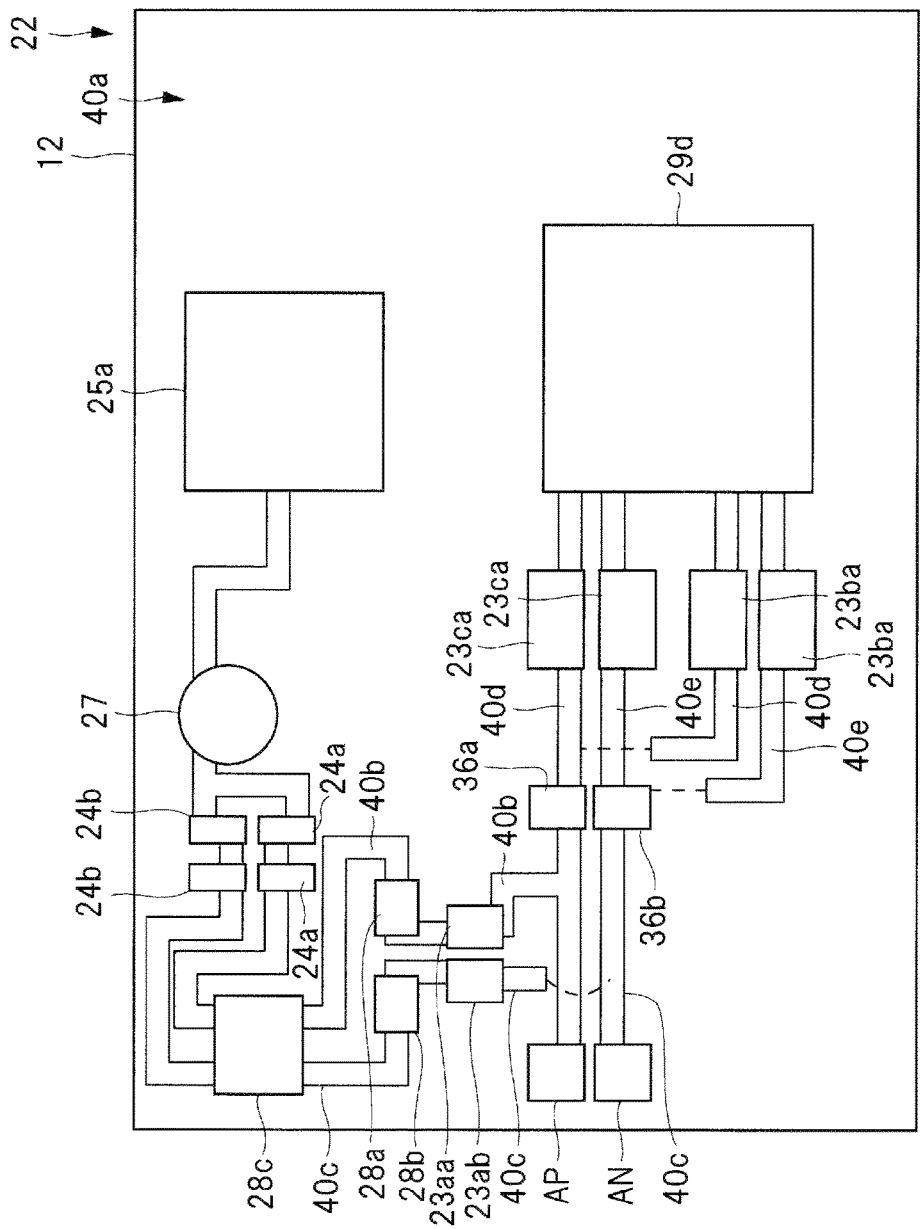
FIG. 17 is a plan view illustrating a layout of the components mounted over the wiring substrate illustrated in FIG. 15.

FIG. 15 is a perspective view illustrating an example of the internal structure of the electronic device for communication of the first embodiment, FIG. 16 is a configuration block diagram of components mounted over a wiring substrate illustrated in FIG. 15, and FIG. 17 is a plan view illustrating a layout of the components mounted over the wiring substrate illustrated in FIG. 15.

The structure illustrated in FIG. 15 is the internal structure of the electronic device for communication (portable devices or portable information device) 22 of the first embodiment. The structure includes a bottom lid 10 serving as a base, the resin substrate 2 having the loop antenna 1 formed therein, the magnetic sheet 3, the battery pack 4, a wiring substrate (substrate, metallic part) 12 having wirings formed therein and having ICs (Integrated Circuit) 12a and electronic components 12b mounted thereon, and a lid 11 with a display serving as a top cover.

The lid 11 is provided with a display 11a and an operation switch 11b.

In such an electronic device for communication 22, the magnetic sheet 3 is arranged between the battery pack (metallic part) 4 and the loop antenna 1, and furthermore the wiring substrate 12 is arranged over the battery pack 4. Namely, the loop antenna 1, the magnetic sheet 3, the battery pack 4, the wiring substrate 12, and the lid 11 with a display are stacked in this order from the bottom lid 10 side.

At this time, the wiring substrate 12 having the ICs 12a and electronic components 12b mounted thereon has an uneven shape, but the battery pack 4 has a flat shape and thus receives less influence of the electromagnetic field 5 than the wiring substrate 12, thereby allowing the shape of the magnetic sheet 3 to be simplified. For example, the thickness of the magnetic sheet 3 may be constant.

Namely, the size of the magnetic sheet 3 in a plan view is larger than the size of the loop antenna 1 in a plan view. Then, the protruding amount, from the outer peripheral portion of the loop antenna 1, of the magnetic sheet 3 is set to two or more times the width (wiring width) of the loop antenna 1, preferably three or more times.

Alternatively, the thickness of the magnetic sheet 3 is 100 μm or more and 650 μm or less.

In this way, a path for magnetic fluxes can be secured inside the magnetic sheet 3, by setting either the size or the thickness of the magnetic sheet 3, or the both thereof to be within the above-described range. Therefore, a reduction of the noise in the wireless power supply system of the electronic device for communication 22 can be achieved, and electric power can be supplied to the electronic device for communication 22. Namely, the interference of magnetic fields by the battery pack 4 can be eliminated and electric power can be supplied to the electronic device for communication 22.

Here, an example of the configuration and layout of the components over the wiring substrate 12 incorporated in the electronic device for communication 22 illustrated in FIG. 15 will be described using FIG. 16 and FIG. 17.

The power of the electronic device for communication 22 of the first embodiment is supplied using a wireless power supply system. Here, in the above-described wireless power supply system, short distance wireless communication allows data to be transmitted and received between a power transmitting side device and a power receiving side device. The above-described short distance wireless communication is the short distance wireless communication (hereinafter, simply referred to as "NFC communication") by, for example, NFC (Near Field Communication).

Furthermore, in the above-described wireless power supply system, non-contact (wireless) power supply from the above-described power transmitting side device to the above-described power receiving side device is possible. Although not limited in particular, the wireless power supply system is an electromagnetic resonance-type power supply system. Here, the sharing of an antenna used for communication by NFC and an antenna used for electromagnetic resonance-type wireless power supply makes it possible to switch between the power transmission/reception and the communication for transmitting information.

The electronic device for communication 22 of the first embodiment is used as a part of the above-described power receiving side device, and is a small portable device such as a portable terminal. In addition, the NFC communication and the charging of a battery by wireless power supply (non-contact power supply) are possible. The above-described power receiving side device includes the loop antenna 1, the electronic device for communication 22, a battery 26, and an internal circuit, as illustrated in FIG. 16.

The loop antenna 1 generates an electromotive force (AC signal) by using the resonance effect of an electromagnetic wave generated by the antenna of the above-described power transmitting side device, and also transmits and receives the signals involved in the NFC communication. The above-described internal circuit is an electronic circuit for realizing a special function as the above-described power receiving side device (e.g., smart phone or the like).

The battery 26 is a secondary battery that can be charged in accordance with a direct current voltage. Although not limited in particular, the battery 26 is, for example, a one-cell type battery (4.0 to 4.2 V), and is, for example, a lithium ion battery.

Note that the electronic device for communication 22 switches between a power supply operation to receive power by using one loop antenna 1 and a communication operation to perform communication for transmitting information. Specifically, the electronic device for communication 22 transmits and receives data via the loop antenna 1 at the time of data communication, whereas at the time of power supply, the electronic device for communication 22 generates a desired voltage on the basis of the electric power received via the loop antenna 1 and also performs driving of each block inside the electronic device for communication 22, performs driving of the above-described internal circuit, performs charging of the battery 26, and the like by using the generated voltage.

Specifically, as illustrated in FIG. 16, the electronic device for communication 22 is constituted as a communication module, in which antenna electrodes AP and AN, matching circuits 23a, 23b, and 23c, a filter circuit 28, a power circuit 25, a switch part SW, and a communication circuit 29 are mounted in a wiring substrate 12 or the like, illustrated in FIG. 17.

The antenna electrodes AP and AN are electrodes for coupling the loop antenna 1. One end of the loop antenna 1 is coupled to the antenna electrode AP, and the other end is coupled to the antenna electrode AN. The antenna electrodes AP and AN are electrically coupled to the communication circuit 29 and also electrically coupled to the power circuit 25.

Hereinafter, a signal path (a path through which a signal is transferred between the antenna electrodes AP and AN and the communication circuit 29) for coupling the antenna electrodes AP and AN to the communication circuit 29 is referred to as a "communication system path", whereas a signal path (a path through which a signal is transferred between the antenna electrodes AP and AN and the power circuit 25) for coupling the antenna electrodes AP and AN to the power circuit 25 is referred to as a "power supply system path."

The communication system path 41 includes not only the various types of signal lines (wiring patterns) coupled between the antenna electrodes AP and AN and the communication circuit 29 but also the matching circuits 23a, 23b, and 23c, the switch part SW, and the like coupled to these signal lines. In addition, the communication system path 41 includes a reception signal path LRx for supplying a signal received by the loop antenna 1 to the communication circuit 29 via the antenna electrodes AP and AN, and a transmission signal path LTx for supplying a signal transmitted from the communication circuit 29 to the loop antenna 1 via the antenna electrodes AP and AN.

The reception signal path LRx includes the matching circuit 23a, the switch part SW, and the matching circuit 23b, and various types of signal lines (wiring patterns) coupling therebetween. The transmission signal path LTx includes the matching circuit 23a, the switch part SW, and the matching circuit 23c, and various types of signal lines (wiring patterns) coupling therebetween. The power supply system path 42 includes not only various types of signal lines (wiring patterns) coupled between the antenna electrodes AP and AN and the power circuit 25 but also the matching circuit 23a coupled to these signal lines.

The communication circuit 29 performs NFC communication with the above-described power transmitting side device via the loop antenna 1. Specifically, the communication circuit 29 includes a communication part 29a, a memory 29b, and a control part 29c. The communication part 29a transmits and receives the signal by NFC communication. For example, at the time of receiving data by NFC communication, the communication part 29a inputs a signal received by the loop antenna 1, from a positive external terminal and a negative external terminal, converts an inputted analog signal to a digital signal, and provides the resultant digital signal to the control part 29c.

In addition, at the time of transmitting data by NFC communication, the communication part 29a converts data (digital signal) provided from the control part 29c, to an analog signal, and outputs the resulting analog signal from the positive external terminal and the negative external terminal. The control part 29c is constituted by, for example, a central processing unit (CPU), and executes a program to generate data to be transmitted by NFC communication and perform various types of data processing based on received data.

The memory 29b includes a ROM, a RAM, and the like. The program executed by the above-described central processing unit is stored in the above-described ROM. The above-described RAM is used for a working area and the like for arithmetic processing performed by the above-described central processing unit. Although not limited in particular, the communication circuit 29 is a semiconductor device of a BGA (Ball Grid Array) type package, in which a semiconductor chip formed on a semiconductor substrate, such as one single crystal silicon, by using the well-known CMOS integrated circuit manufacturing technology is sealed with an insulating resin such as a mold resin.

The matching circuit 23a is for matching the impedances between the loop antenna 1 and the power circuit 25. The matching circuits 23a, 23b, and 23c are for matching the impedances between the loop antenna 1 and the communication circuit 29. The matching circuits 23a, 23b, and 23c are constituted by including, for example, a capacitive element, an inductor, and the like. For example, the matching circuit 23a includes a capacitive element coupled in series between the antenna terminals AP and AN, and the power circuit 25.

The matching circuit 23b includes a capacitive element coupled in series between the antenna terminals AP and AN and the external terminal of the communication circuit 29, and the matching circuit 23c includes: a capacitive element coupled in series between the antenna terminals AP and AN and the external terminal of the communication circuit 29; and a capacitor coupled to a transmission terminal. Note that the matching circuits 23a, 23b, and 23c are not limited to the circuit configuration illustrated in FIG. 16, and various kinds of modifications are possible in order to obtain a desired property.

The filter circuit 28 is for achieving a reduction of the noise in the power supply system path 42.

The power circuit 25 generates various direct current voltages on the basis of an AC signal received via the loop antenna 1, and performs control for supplying the generated direct current voltage to each functional part in the above-described power receiving side device.

The rectifier circuit 24 rectifies an AC signal obtained via the loop antenna 1 and outputs the resulting signal. Although not limited in particular, the rectifier circuit 24 is a bridge-type full wave rectifying circuit constituted using four rectifier diodes. In addition, a capacitor (condenser) 27 is a smoothing capacitor coupled between the rectifier circuit 24 and the power circuit 25. Therefore, a voltage rectified by the rectifier circuit 24 is smoothed.

The switch part SW includes a switch circuit SWP provided between the antenna electrode AP and the communication circuit 29, and a switch circuit SWN provided between the antenna electrode AN and the communication circuit 29. Additionally, in carrying out communication via the loop antenna 1, the switch circuits SWP and SWN couple the antenna electrodes AP and AN, and the communication circuits 29. On the other hand, when the power circuit 25 generates a direct current voltage on the basis of an AC signal received by the loop antenna 1, the switch circuits SWP and SWN perform blocking between the antenna electrodes AP and AN and the communication circuits 29.

Next, a component arrangement over the wiring substrate 12 illustrated in FIG. 17 will be described.

Here, the mounting components in the power supply system path (see FIG. 16) 42 mounted over the wiring substrate 12 illustrated in FIG. 17 are described referring to FIG. 16. Note that the wiring substrate 12 is a substrate for mounting a plurality of ICs 12a and electronic components 12b as illustrated in FIG. 15, and wirings being a plurality of conductor patterns (also including a plane wiring of a large area) for electrically coupling these mounting components are formed.

First, in the wiring substrate 12, the antenna electrode AP coupled to one electrode terminal of the loop antenna 1 illustrated in FIG. 1 and the antenna electrode AN coupled to the other electrode terminal of the loop antenna 1 are provided as a pair.

At this time, the antenna electrode AP and the antenna electrode AN are provided at an edge of a principal surface 40a of a mounting substrate 40. Therefore, a more space for component arrangement can be secured.

In addition, a first wiring 40b is coupled to the antenna electrode AP, whereas a second wiring 40c is coupled to the antenna electrode AN.

Furthermore, a first resonance condenser (resonance component) 23aa that is the matching circuit 23a provided to be coupled to the antenna electrode AP via the first wiring 40b, while a second resonance condenser (resonance component) 23ab that is the matching circuit 23a provided to be coupled to the antenna electrode AN via the second wiring 40c.

Moreover, a first ferrite bead 28a that is a resistor is coupled to the first wiring 40b, as the filter circuit 28. In this way, a second ferrite bead 28b that is a resistor is coupled to the second wiring 40c, as the filter circuit 28. Note that the first ferrite bead 28a and the second ferrite bead 28b are arranged in a position between the antenna electrodes AP and AN, and the rectifier circuit 24.

In this way, as the filter circuit 28, a common mode choke 28c that is an inductor (coil) is coupled to the antenna electrodes AP and AN via the first wiring 40b and the second wiring 40c. The common mode choke 28c is arranged in a position between the antenna electrodes AP and AN, and the rectifier circuit 24.

Electric current components of frequencies lower than a target frequency can be passed therethrough and electric current components of frequencies higher than the target frequency can be blocked, by arranging the common mode choke 28c.

Then, a first rectifier diode 24a that is the rectifier circuit 24 is provided to be coupled to the antenna electrode AP via the first wiring 40b, whereas a second rectifier diode 24b that is the rectifier circuit 24 provided to be coupled to the antenna electrode AN via the second wiring 40c.

Here, a total of four rectifier diodes are mounted as the rectifier circuit 24, and an alternating current (sine wave) is converted to a direct current (DC) by using these rectifier diodes.

In addition, in the subsequent stage of the rectifier circuit 24, the capacitor (condenser) 27 for smoothing a voltage is provided so as to be coupled to the antenna electrodes AP and AN via the first wiring 40b and the second wiring 40c.

Furthermore, in the subsequent stage of the capacitor (condenser) 27, a DC/DC converter 25a as the power circuit 25, which generates a DC voltage in accordance with a voltage rectified by the rectifier circuit 24 is provided to be coupled to the antenna electrodes AP and AN via the first wiring 40b and the second wiring 40c.

Moreover, the communication circuit 29 illustrated in FIG. 16 is coupled to the antenna electrodes AP and AN via the first wiring 40b and the second wiring 40c.

Note that, in the power supply system path 42, because a common mode current flowing through the power supply system path 42 can be reduced, a human body is protected from an electromagnetic wave of the common mode noise, and the influence of noise on a distant place can be suppressed.

In addition, the influence of noise on the loop antenna coupled to the antenna electrodes AP and AN can be suppressed, by the arrangement of the noise suppression components (the ferrite beads and the common mode choke).

Next, the mounting components in the communication system path (see FIG. 16) 41 mounted over the wiring substrate 12 illustrated in FIG. 17 will be described referring to FIG. 16.

First, in the power supply system path 42, there are provided the first wiring 40b and the second wiring 40c, which are coupled to the condensers (the first resonance condenser 23aa and second resonance condenser 23ab) and the ferrite beads (the first ferrite bead 28a and second ferrite bead 28b), and a third wiring 40d and a fourth wiring 40e separately coupled to the first wiring 40b and the second wiring 40c. Among these wirings, in the third wiring 40d, there is provided an IC 36a for SW that is the SWN of the SW illustrated in FIG. 16. On the other hand, in the fourth wiring 40e, there is provided an IC 36b for SW that is the SWP of the SW.

Furthermore, a condenser 23ca that is the matching circuit 23c and a condenser 23ba that is the matching circuit 23b are coupled to the IC 36a for SW via the third wiring 40d. On the other hand, in the same way, the condenser 23ca that is the matching circuit 23c and the condenser 23ba that is the matching circuit 23b are coupled also to the IC 36b for SW via the fourth wiring 40e.

Then, a communication IC 29d that is the communication circuit 29 is coupled to each of the condenser 23ca and the condenser 23ba via the third wiring 40d and the fourth wiring 40e. The communication IC 29d includes the communication part 29a, the memory 29b, and the control part 29c thereinside. Note that the communication IC 29d is coupled also to the DC/DC converter 25a via another wiring.

Figure 18:
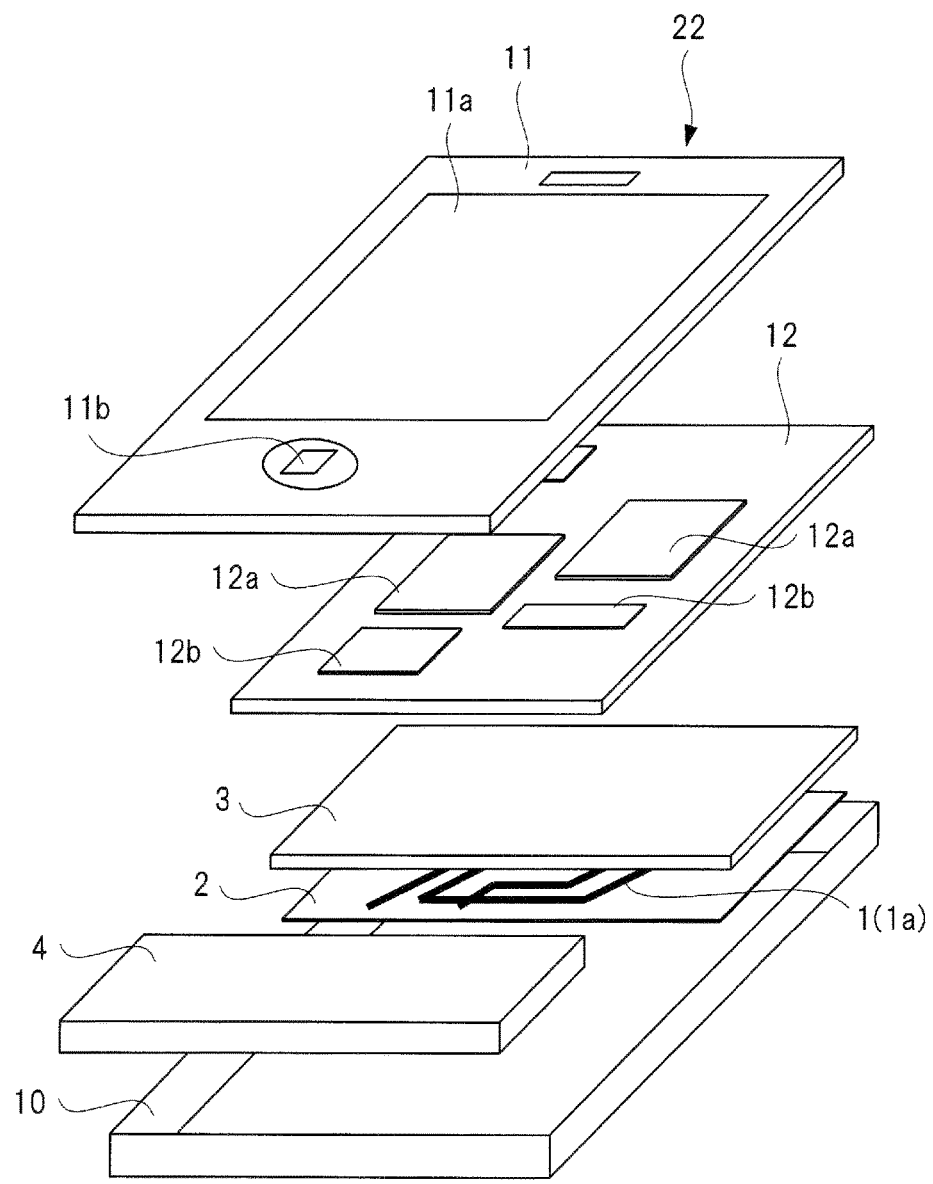
FIG. 18 is a perspective view illustrating the internal structure of an electronic device for communication of a first modification of the first embodiment.

Next, a first modification of the first embodiment will be described using FIG. 18. FIG. 18 is a perspective view illustrating the internal structure of an electronic device for communication of the first modification.

In the electronic device for communication 22 illustrated in FIG. 18, the battery pack 4 is arranged side by side next to the loop antenna 1 (the loop antenna 1 and the battery pack 4 are flatly arranged) and the wiring substrate (metallic part) 12 is located over the loop antenna 1.

In this structure, a countermeasure for the noise generated from the wiring substrate 12 is required to be taken. Namely, a plurality of ICs 12a and electronic components 12b are mounted over the wiring substrate 12 as described above, and noise is generated from these ICs 12a and electronic components 12b and the wiring patterns coupled thereto. Furthermore, a plane wiring of a large area may be formed in the wiring substrate 12, and is substantially equal to a metal plate.

Therefore, in the electronic device for communication 22 of the first modification illustrated in FIG. 18, the magnetic sheet 3 is interposed between the loop antenna 1 and the wiring substrate (metallic part) 12. Then, the size of the magnetic sheet 3 in a plan view is larger than the size of the loop antenna 1 in a plan view. Furthermore, the protruding amount, from the outer peripheral portion of the loop antenna 1, of the magnetic sheet 3 is set to twice or more the width (wiring width) of the loop antenna 1, preferably three times or more.

Alternatively, the thickness of the magnetic sheet 3 is 100 μm or more and 650 μm or less.

In this way, a path for magnetic fluxes can be secured inside the magnetic sheet 3, by setting either one of the size and the thickness of the magnetic sheet 3, or the both thereof within the above-described range. Therefore, even when a configuration is such that the battery pack 4 is arranged side by side next to the loop antenna 1 and the wiring substrate (metallic part) 12 is located over the loop antenna 1, a reduction of the noise in the wireless power supply system of the electronic device for communication 22 can be achieved, and electric power can be supplied to the electronic device for communication 22. Namely, the magnetic interference by the influence of not only the battery pack 4 but also the ICs 12a, the electronic component 12b, and the wiring pattern over the wiring substrate 12 can be eliminated, and electric power can be supplied to the electronic device for communication 22.

Next, a second modification of the first embodiment will be described.

Figure 19:
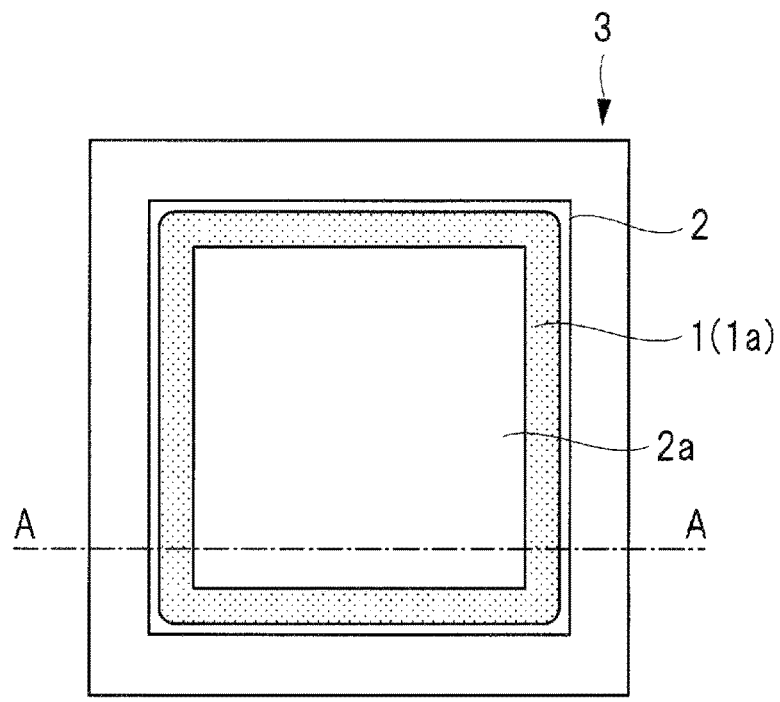
FIG. 19 is a plan view illustrating a stacked structure of a loop antenna, a magnetic sheet, and a wiring substrate of a second modification of the first embodiment.
Figure 20:
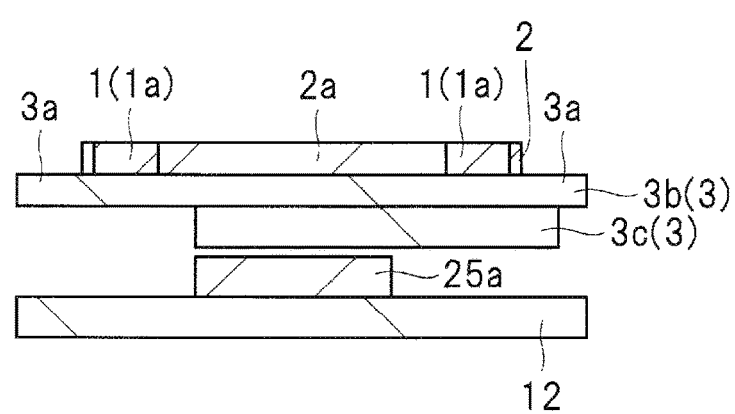
FIG. 20 is a cross-sectional view illustrating a structure of a cross section cut along an A-A line illustrated in FIG. 19.
Figure 21:
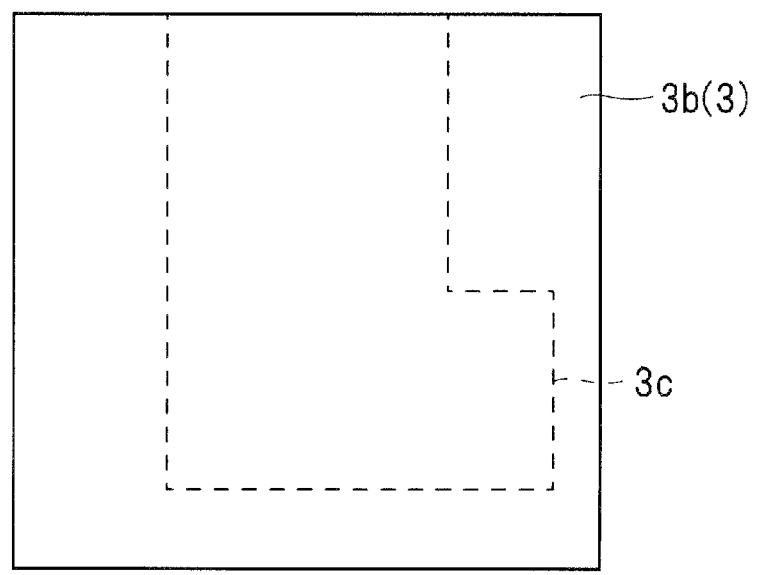
FIG. 21 is a plan view of the magnetic sheet in the stacked structure illustrated in FIG. 20.
Figure 22:
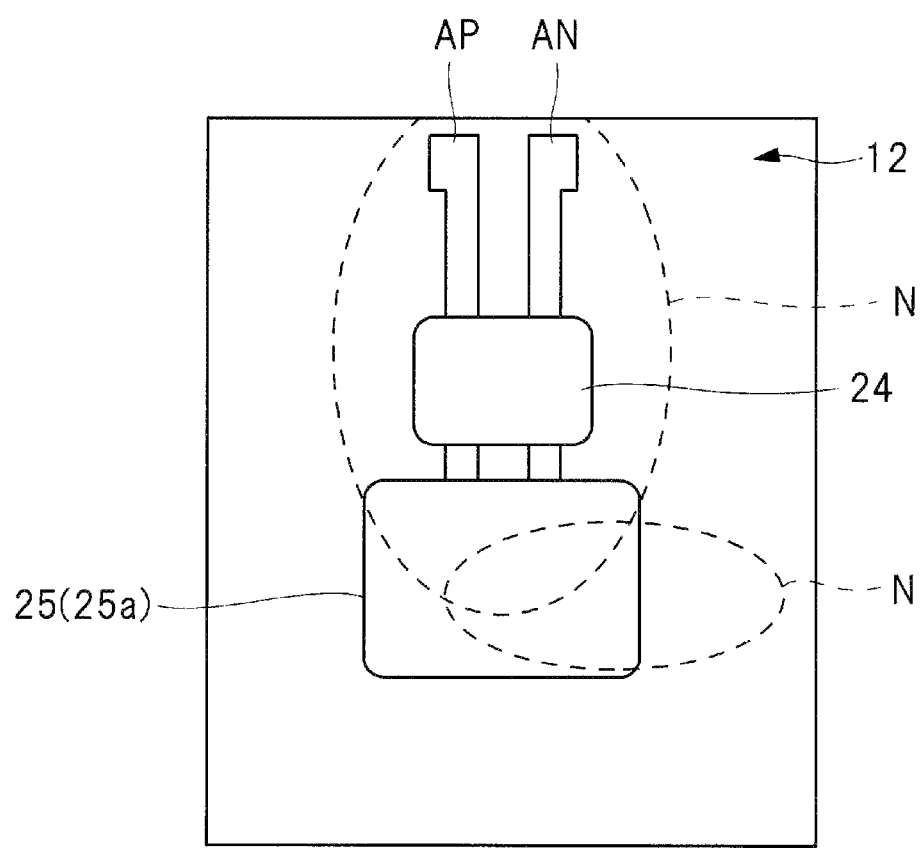
FIG. 22 is a plan view of the wiring substrate in the stacked structure illustrated in FIG. 20.

FIG. 19 is a plan view illustrating a stacked structure of a loop antenna, a magnetic sheet, and a wiring substrate of the second modification of the first embodiment, FIG. 20 is a cross-sectional view illustrating a structure of a cross section cut along an A-A line illustrated in FIG. 19, FIG. 21 is a plan view of the magnetic sheet in the stacked structure illustrated in FIG. 20, and FIG. 22 is a plan view of the wiring substrate in the stacked structure illustrated in FIG. 20.

The structure of the second modification is illustrated as to a noise countermeasure in a case where the internal structure of the electronic device for communication 22 is a stacked structure as illustrated in FIG. 20. In the structure illustrated in FIG. 19 and FIG. 20, the magnetic sheet 3 having a two-layer structure is arranged over the wiring substrate 12 and the loop antenna 1 is arranged in the upper layer thereof. Namely, the magnetic sheet 3 having a two-layer structure is arranged between the wiring substrate 12 and the loop antenna 1, inside the electronic device for communication 22.

This means that the magnetic sheet 3 having a large magnetic loss is arranged in an area where the noise generated from the components and wiring pattern above the substrate (wiring substrate 12) is large and thus the noise generated from the substrate is suppressed.

Specifically, a two-layer structure constituted of a first layer 3b arranged on the loop antenna 1 side and formed of a magnetic substance and a second layer 3c arranged on the wiring substrate 12 side and formed of a magnetic substance is used as the magnetic sheet 3. In this case, the magnitude of magnetic loss differs between the first layer 3b and the second layer 3c, and for example, the second layer 3c is formed of a material having a larger magnetic loss than the first layer 3b.

Namely, the first layer 3b and the second layer 3c are formed of a magnetic substance of a material having a different magnetic loss, respectively, and the magnetic sheet 3 is formed by sticking together the first layer 3b and the second layer 3c.

Then, the magnetic sheet 3 is arranged so that the second layer 3c having a large magnetic loss is arranged on the wiring substrate 12 side where a large noise is generated and on the other hand, the first layer 3b having a smaller magnetic loss is arranged on the loop antenna 1 side.

Here, as illustrated in FIG. 22, the rectifier circuit 24 and power circuit 25 coupled to the antenna electrode AP and antenna electrode AN by wiring are arranged over the wiring substrate 12, and a high current flows through these rectifier circuits 24 and power circuit 25, and thus a large noise is generated from these components and this area serves as a noise generation area N. When the loop antenna 1 arranged in an upper layer of the wiring substrate 12 is affected by the noise from the wiring substrate 12, the efficiency between the antennas will decrease. Alternatively, the noise further increases.

The noise of the wiring substrate 12 is generated from a power supply input line, a clock line, or the peripheral components thereof.

Accordingly, countermeasures are taken, for example, for increasing the thickness of the magnetic sheet 3 over the noise generation area N or sticking together the magnetic sheets each having a different magnetic loss, for arranging the magnetic sheet having a larger magnetic loss on the substrate side, and the like, and thus the influence of the noise from the wiring substrate 12 on the loop antenna 1 can be blocked.

In increasing the thickness of the magnetic sheet 3, the thickness may be partially increased or the magnetic sheet 3 may be made into partially multi layers, for example.

In the example illustrated in FIG. 22, the second layer 3c, of the magnetic sheet 3, formed of a material having a larger magnetic loss is arranged corresponding to a position (the noise generation area N illustrated by a dotted line in FIG. 22) in which the rectifier circuit 24 or the power circuit 25 is arranged. Namely, the magnetic sheet 3 is arranged so that the second layer 3c illustrated in FIG. 21 corresponds to the position and planar shape of the noise generation area N illustrated in FIG. 22. This means that the planar shape of the second layer 3c, of the magnetic sheet 3, formed of a material having a larger magnetic loss is matched with the planar shape of the noise generation area N in advance and the magnetic sheet 3 is arranged so that the second layer 3c matches with the shape of the noise generation area N.

Thus, the noise generated from the wiring substrate 12 can be shielded by the second layer 3c of the magnetic sheet 3.

Then, the first layer 3b of the magnetic sheet 3 is formed so as to have a smaller magnetic loss than the second layer 3c and so that the size thereof in a plan view becomes larger than the size of the loop antenna 1 in a plan view. Specifically, as illustrated in FIG. 20, the first layer 3b includes the protruding portion 3a that protrudes outside the outer peripheral portion of the loop antenna 1, across the whole circumference thereof.

Therefore, a path for magnetic fluxes can be secured inside the magnetic sheet 3, and the magnetic interference from the wiring substrate 12 can be eliminated.

As a result, electric power can be supplied to the electronic device for communication 22.

Note that the size and shape of the second layer 3c of the magnetic sheet 3 having a two-layer structure may be set to be the same as the size and shape of the first layer 3b. However, the first layer 3b can be made to have a small area as required by matching the shape of the first layer 3b with the shape of the noise generation area N, and thus a reduction in cost and a reduction in weight of the magnetic sheet 3 having a two-layer structure can be achieved.

Second Embodiment

Figure 23:
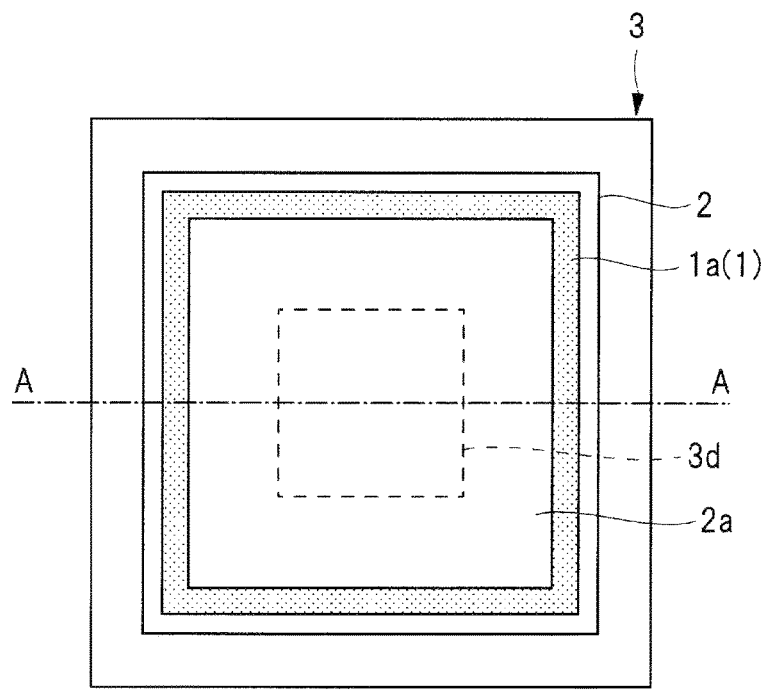
FIG. 23 is a plan view illustrating a structure of a loop antenna and a magnetic sheet of a second embodiment.
Figure 24:
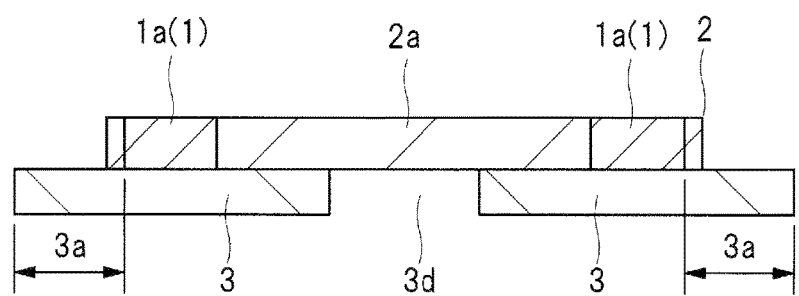
FIG. 24 is a cross-sectional view illustrating a structure of a cross section cut along an A-A line illustrated in FIG. 23.

FIG. 23 is a plan view illustrating a structure of a loop antenna and a magnetic sheet of a second embodiment, and FIG. 24 is a cross-sectional view illustrating a structure of a cross section cut along an A-A line illustrated in FIG. 23.

In the magnetic sheet 3 illustrated in FIG. 23 and FIG. 24, a through-hole 3d penetrating from the front surface thereof to the back surface thereof is formed at the center part.

Namely, in a structure in which the magnetic sheet 3 is arranged in the lower part of the loop antenna 1 formed in the resin substrate (rigid substrate) 2, the magnetic sheet 3 is hollowed out at a position corresponding to the center part of the loop antenna 1 in a plan view, to thereby form the magnetic sheet 3 in the shape of a frame (in the shape of a ring or in the shape of a doughnut). Namely, the center part of the magnetic sheet 3 is hollowed out by punching, resulting in a cavity.

The area of the magnetic substance can be reduced and a reduction in cost and a reduction in weight of the magnetic sheet 3 can be achieved, by using the magnetic sheet 3 whose center part is cut out and which serves as a cavity, in the case or the like where there is no influence on the efficiency between antennas.

Next, a first modification of the second embodiment will be described.

Figure 25:
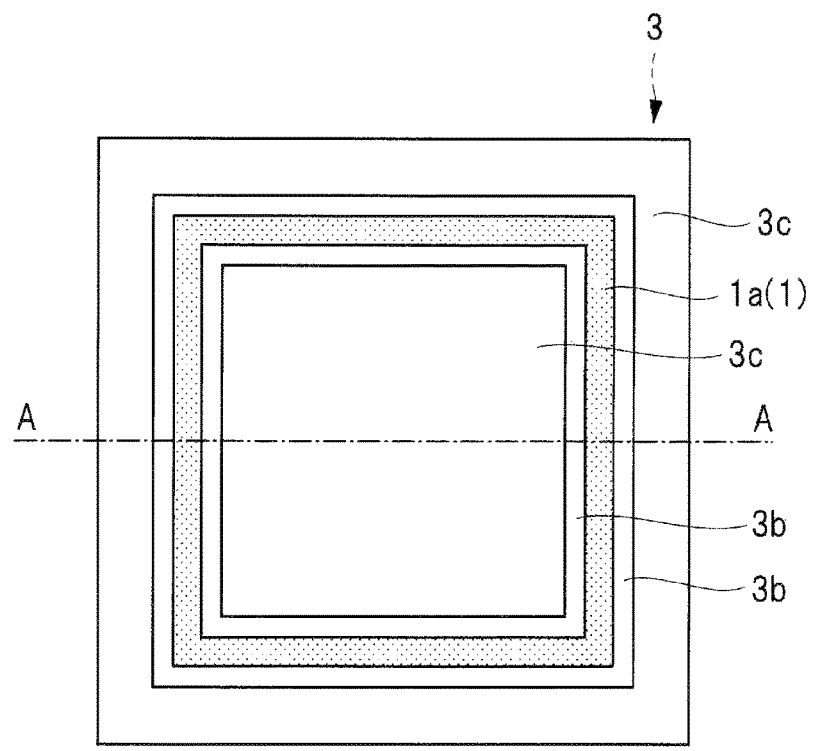
FIG. 25 is a plan view illustrating a structure of a loop antenna and a magnetic sheet of a first modification of the second embodiment.
Figure 26:
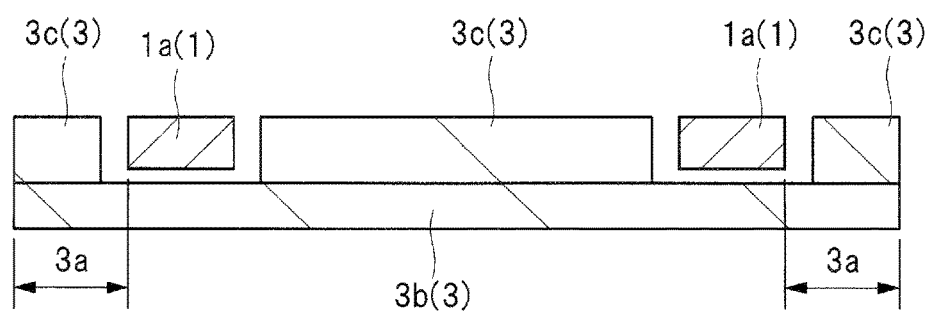
FIG. 26 is a cross-sectional view illustrating a structure of a cross section cut along an A-A line illustrated in FIG. 25.

FIG. 25 is a plan view illustrating a structure of a loop antenna and a magnetic sheet of the first modification of the second embodiment, and FIG. 26 is a cross-sectional view illustrating a structure of a cross section cut along an A-A line illustrated in FIG. 25.

In the first modification of the second embodiment illustrated in FIG. 25 and FIG. 26, the magnetic sheet 3 having a two-layer structure that is constituted by a first layer 3b formed of a magnetic substance and a second layer 3c formed of another magnetic substance is arranged with respect to the loop antenna 1 that is formed by a single wire and the like not by a rigid substrate. That is, in the magnetic sheet 3, the first layer 3b is arranged on the underlayer side and the second layer 3c is arranged on the upper layer side, and the second layer 3c that is a part of the magnetic sheet 3 is arranged on both the inside and outside of the loop shape of the loop antenna 1.

Namely, as illustrated in FIG. 25, in the upper layer, both the inside and the outside of the loop antenna 1 are surrounded by the second layer 3c.

By forming the magnetic sheet 3 into a two-layer structure and increasing the thickness thereof in this manner, the amount of the magnetic substance can be reduced as compared with a case where the area is increased in the plane direction, and a reduction in weight and a reduction in cost can be achieved. In addition, the number of obtained magnetic sheets 3 on a sheet can be increased as compared with a case where the area is increased in the plane direction, and a reduction in cost can be further achieved.

Furthermore, since the second layer 3c that is the magnetic substance in the upper layer is arranged between the antennas, the magnetic interference between the antennas can also be suppressed and a further reduction in size of the antenna can be achieved.

Next, a second modification of the second embodiment will be described.

Figure 27:
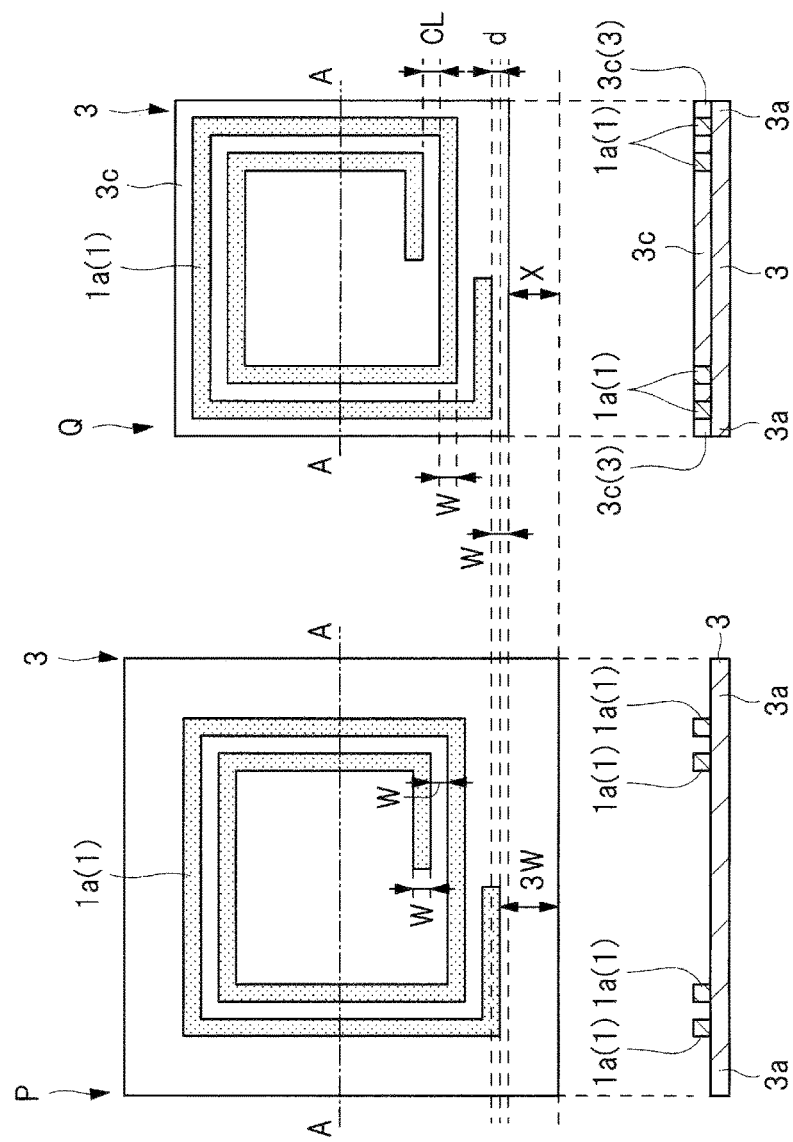
FIG. 27 shows a plan view and a cross-sectional view illustrating a structure of a loop antenna and a magnetic sheet of a second modification of the second embodiment.
Figure 28:
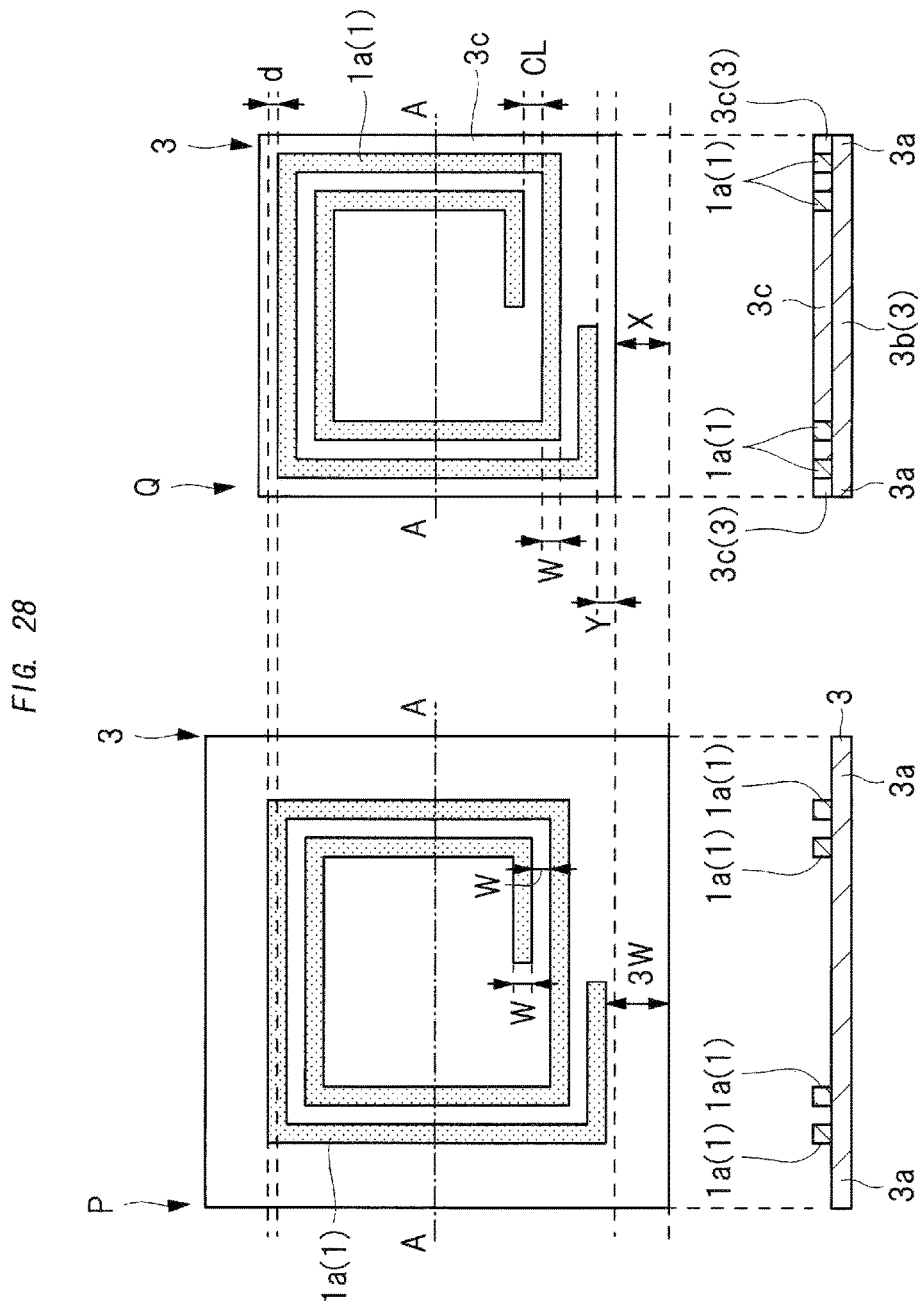
FIG. 28 shows a plan view and a cross-sectional view illustrating a structure of a loop antenna and a magnetic sheet of the second modification of the second embodiment.

FIG. 27 and FIG. 28 each show plan views and cross-sectional views illustrating a structure of a loop antenna and a magnetic sheet of the second modification of the second embodiment.

In the structure illustrated in FIG. 27, the number of turns of the loop antenna 1 is two, and at that time, the magnetic sheet 3 having a one-layer structure (P structure of FIG. 27) and the magnetic sheet 3 having a two-layer structure (Q structure of FIG. 27) are compared. When the inductance of the antenna is attempted to be set to the same value between the magnetic sheet 3 having a one-layer structure (P structure of FIG. 27) and the magnetic sheet 3 having a two-layer structure (Q structure of FIG. 27), the space between the antenna wirings can be made narrower in the case of the two-layer structure (Q structure of FIG. 27) in which the magnetic substance (the second layer 3c) is arranged between the antenna wirings.

Specifically, in the P structure (one-layer structure) of FIG. 27, both the wiring width and wiring space of the antenna are W, whereas in the Q structure (two-layer structure) of FIG. 27, the wiring width of the antenna is W and the wiring space is CL.

In this case, if a difference (on one side) in the size of the outer shape between the magnetic sheet 3 having a one-layer structure and the magnetic sheet 3 having a two-layer structure is expressed as X, the wiring width of the antenna is expressed as W, and a difference in the size of the outer shape of the antenna between the P structure and Q structure of FIG. 28 is expressed as d, then CL<W and X=2W+d hold.

This is because, by making a comparison between the magnetic sheet 3 having a one-layer structure and the magnetic sheet 3 having a two-layer structure, the size of the outer shape of the magnetic sheet 3 can be made smaller by 2W in the latter than in the former (see FIG. 41 to be described later), and furthermore, as illustrated in FIG. 28, when the antenna has two turns, the size of the outer shape of the antenna can be made smaller by d in the magnetic sheet 3 having a two-layer structure (Q structure) than in the magnetic sheet 3 having a one-layer structure (P structure).

Accordingly, in the case where the antenna has two turns and the magnetic sheet 3 has a two-layer structure, the outer shape of the magnetic sheet 3 can be made smaller by 2W+d than in the case where the antenna has two turns and the magnetic sheet 3 has a one-layer structure. Therefore, X=2W+d holds.

Then, when there is no influence on the efficiency between the antennas, in the Q structure (the magnetic sheet 3 having two turns and a two-layer structure) of FIG. 28, the width of the outside of the antenna in the magnetic sheet 3 (the protruding amount of the protruding portion 3a of the magnetic sheet 3) can be further reduced and a reduction in the size of the outer shape of the magnetic sheet 3 can be achieved.

For example, in the Q structure of FIG. 28, if the width of the outside of the antenna in the magnetic sheet 3 is expressed as Y, then CL<W and Y<W hold and thus X=3W+d−Y (X+Y=3W+d) holds.

Accordingly, even in the case where the number of turns of the loop antenna 1 is two, the wiring space of the antenna can be reduced and the outer shape of the antenna can be made smaller than in the case where the magnetic sheet 3 has a one-layer structure, by forming the magnetic sheet 3 in a two-layer structure. Namely, by forming the magnetic sheet 3 in a two-layer structure, a reduction in size of the magnetic sheet 3 can be achieved.

Next, a third modification of the second embodiment will be described.

Figure 29:
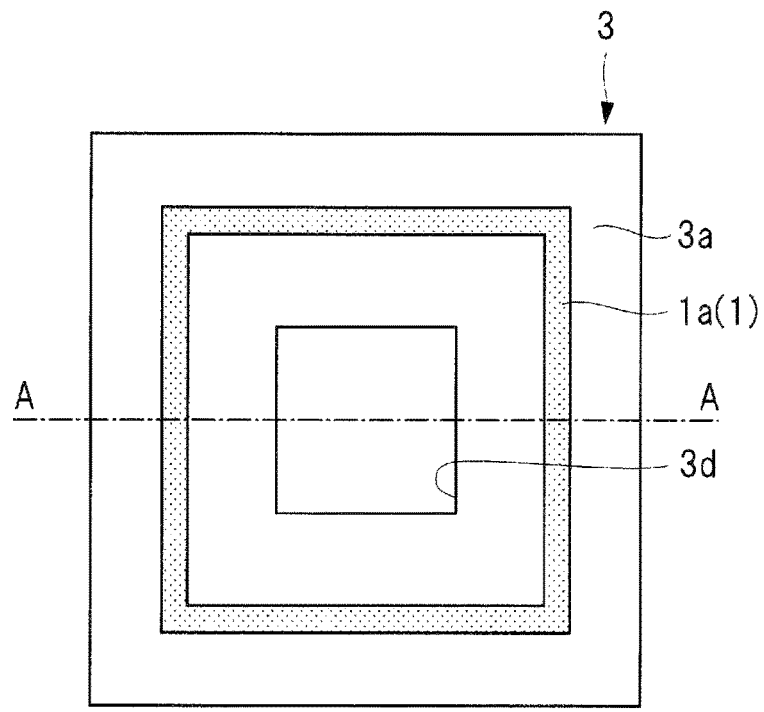
FIG. 29 is a plan view illustrating a structure of a loop antenna and a magnetic sheet of a third modification of the second embodiment.
Figure 30:
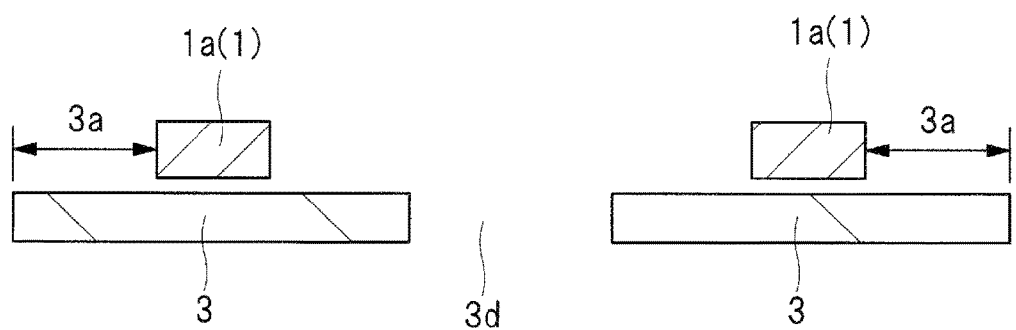
FIG. 30 is a cross-sectional view illustrating a structure of a cross section cut along an A-A line illustrated in FIG. 29.

FIG. 29 is a plan view illustrating a structure of a loop antenna and a magnetic sheet of the third modification of the second embodiment, and FIG. 30 is a cross-sectional view illustrating a structure of a cross section cut along an A-A line illustrated in FIG. 29.

The structure in FIG. 29 and FIG. 30 illustrates a case where the magnetic sheet 3 having a one-layer structure is arranged with respect to the loop antenna 1 formed of a single wire and the like. Here, in the magnetic sheet 3, the through-hole 3d penetrating from the front surface thereof to the back surface thereof is formed at the center part.

Namely, the portion of the magnetic sheet 3 at a position corresponding to the center part of the loop antenna 1 in a plan view is cut out and as a result the magnetic sheet 3 is formed in the shape of a frame (in the shape of a ring or in the shape of a doughnut). That is, the center part of the magnetic sheet 3 is cut out by punching, thereby resulting in a cavity.

Also in this structure, when there is no influence on the efficiency between antennas, a reduction in cost and a reduction in weight can be achieved as compared with the magnetic sheet 3 having a one-layer structure (with no cutout) and the magnetic sheet 3 having a two-layer structure because the center part of the magnetic sheet 3 is hollow.

Next, a fourth modification of the second embodiment will be described.

Figure 31:
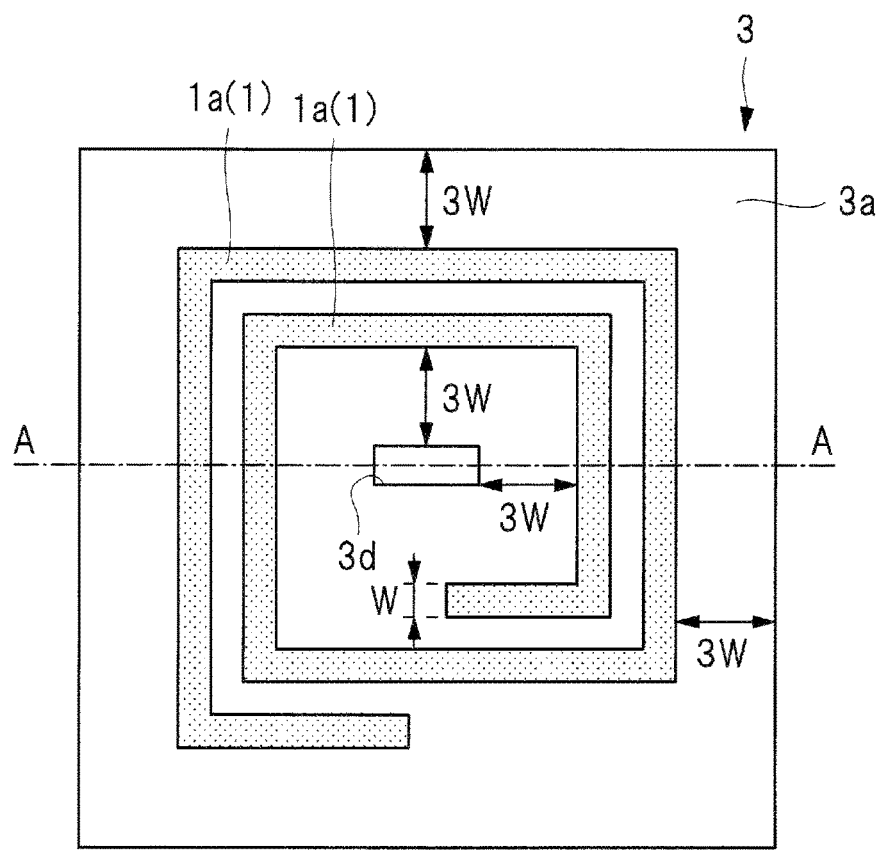
FIG. 31 is a plan view illustrating a structure of a loop antenna and a magnetic sheet of a fourth modification of the second embodiment.
Figure 32:
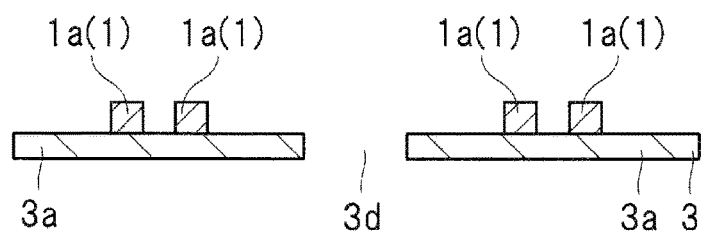
FIG. 32 is a cross-sectional view illustrating a structure of a cross section cut along an A-A line illustrated in FIG. 31.

FIG. 31 is a plan view illustrating a structure of a loop antenna and a magnetic sheet of the fourth modification of the second embodiment and FIG. 32 is a cross-sectional view illustrating a structure of a cross section cut along an A-A line illustrated in FIG. 31.

FIG. 31 and FIG. 32 illustrate a structure in which the loop antenna 1 is formed of a single wire and the like and the number of turns of the loop antenna 1 is two. Besides, the magnetic sheet 3 has a one-layer structure and the through-hole 3d penetrating from the front surface to the back surface is formed in the vicinity of the center part.

As illustrated in FIG. 31, the protruding amount of the protruding portion 3a of the magnetic sheet 3 is twice the wiring width W of the antenna, preferably three times (3W), with respect to the wiring width W of the antenna. The protruding portion 3a is applicable not only to the outermost peripheral antenna but also to the inner area of the innermost peripheral antenna.

Accordingly, the through-hole 3d, namely, a cavity, can be formed in the vicinity of the center part, by setting the protruding amount of the protruding portion 3a from the innermost peripheral antenna of the magnetic sheet 3 to a size of 3W.

Thereby, since the amount of the magnetic substance can be reduced in the vicinity of the center part, a reduction in cost and a reduction in weight of the magnetic sheet 3 can be achieved.

Next, a fifth modification of the second embodiment will be described.

Figure 33:
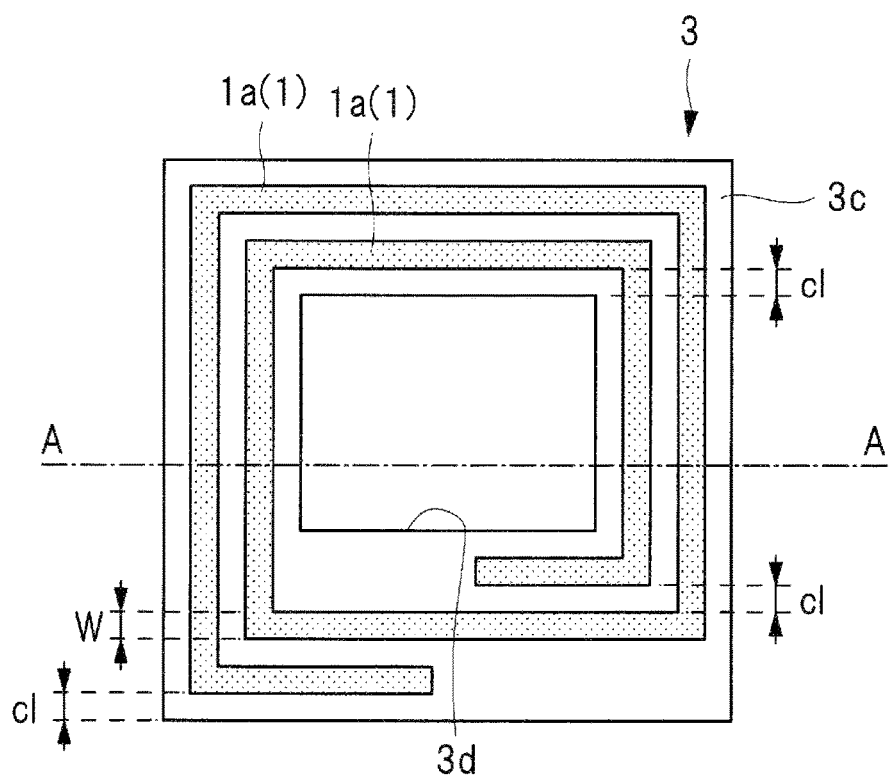
FIG. 33 is a plan view illustrating a structure of a loop antenna and a magnetic sheet of a fifth modification of the second embodiment.
Figure 34:
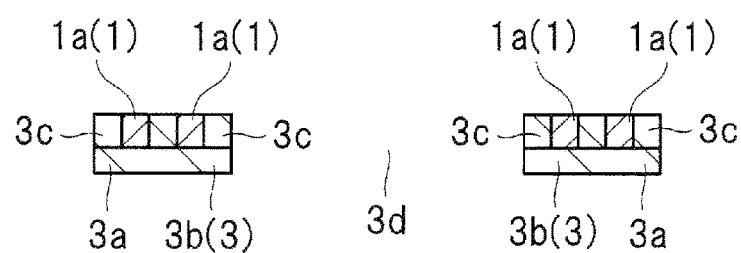
FIG. 34 is a cross-sectional view illustrating a structure of a cross section cut along an A-A line illustrated in FIG. 33.

FIG. 33 is a plan view illustrating a structure of a loop antenna and a magnetic sheet of the fifth modification of the second embodiment, and FIG. 34 is a cross-sectional view illustrating a structure of a cross section cut along an A-A line illustrated in FIG. 33.

FIG. 33 and FIG. 34 illustrate a structure in which the loop antenna 1 is formed of a single wire and the like and the number of turns of the loop antenna 1 is two. Besides, the magnetic sheet 3 has a two-layer structure and the through-hole 3d penetrating from the front surface to the back surface is formed in the vicinity of the center part.

As illustrated in FIG. 33, with respect to the wiring width W of the antenna, the protruding amount of the protruding portion 3a of the magnetic sheet 3 is c1 that is smaller than the wiring width W of the antenna because the magnetic sheet 3 has a two-layer structure. As with the case of the one-layer structure, the protruding portion 3a is applicable not only to the outermost peripheral antenna but also to the inner area of the innermost peripheral antenna.

Accordingly, the through-hole 3d, namely, a cavity, can be formed, with a further larger area, in the vicinity of the center part, by setting the protruding amount of the protruding portion 3a from the innermost peripheral antenna of the magnetic sheet 3 to c1.

Thereby, since the amount of the magnetic substance can be further reduced in the vicinity of the center part, a reduction in cost and a reduction in weight of the magnetic sheet 3 can be further achieved.

Next, a sixth modification of the second embodiment will be described.

Figure 35:
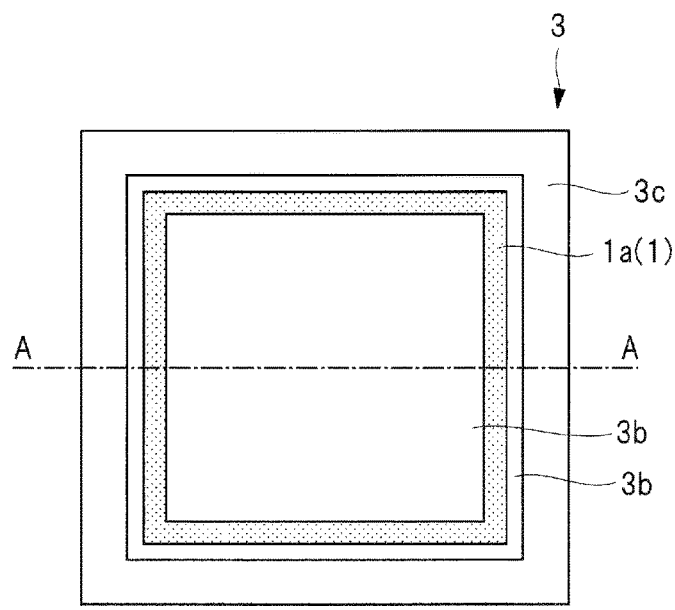
FIG. 35 is a plan view illustrating a structure of a loop antenna and a magnetic sheet of a sixth modification of the second embodiment.
Figure 36:
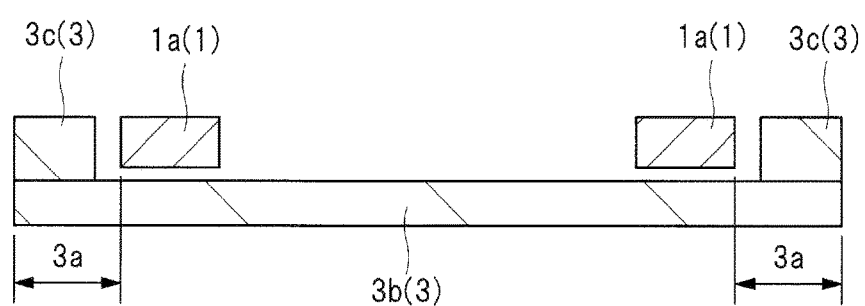
FIG. 36 is a cross-sectional view illustrating a structure of a cross section cut along an A-A line illustrated in FIG. 35.

FIG. 35 is a plan view illustrating a structure of a loop antenna and a magnetic sheet of the sixth modification of the second embodiment, and FIG. 36 is a cross-sectional view illustrating a structure of a cross section cut along an A-A line illustrated in FIG. 35.

In the structure illustrated in FIG. 35 and FIG. 36, the magnetic sheet 3 having a one-layer structure (only a part of the magnetic sheet 3 has a two-layer structure) is arranged and the magnetic substance (the second layer 3c) having a two-layer structure is arranged only on the outside of the antenna, with respect to the loop antenna 1 formed by a single wire and the like. Note that the outside of the antenna is surrounded by the magnetic sheet (the second layer 3c) 3 that is the upper layer, across the whole circumference.

In the structure of the sixth modification, by forming the magnetic substance of the outside of the antenna so as to have a two-layer structure, a reduction in size can be achieved as compared with enlargement of the magnetic sheet 3 in the plane direction, and a reduction in weight can be achieved as compared with the magnetic sheet 3 having a whole two-layer structure.

Next, a seventh modification of the second embodiment will be described.

Figure 37:
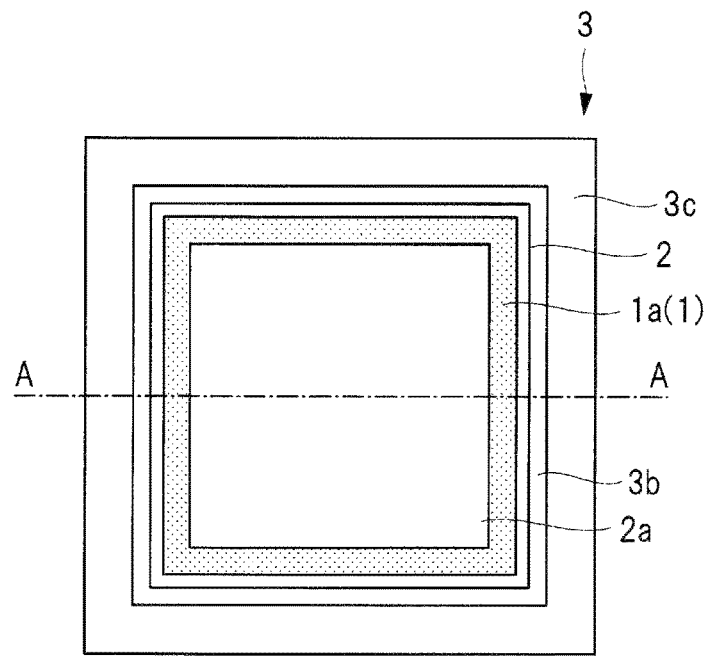
FIG. 37 is a plan view illustrating a structure of a loop antenna and a magnetic sheet of a seventh modification of the second embodiment.
Figure 38:
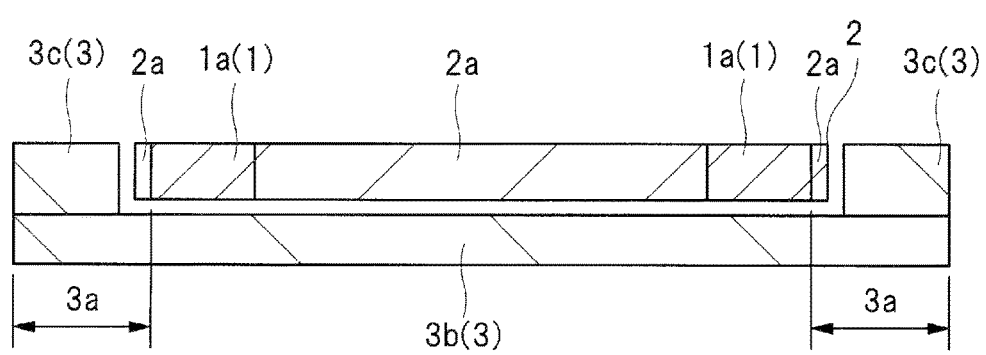
FIG. 38 is a cross-sectional view illustrating a structure of a cross section cut along an A-A line illustrated in FIG. 37.

FIG. 37 is a plan view illustrating a structure of a loop antenna and a magnetic sheet of the seventh modification of the second embodiment, and FIG. 38 is a cross-sectional view illustrating a structure of a cross section cut along an A-A line illustrated in FIG. 37.

In the structure illustrated in FIG. 37 and FIG. 38 as compared with the structure in which the magnetic sheet 3 is arranged under the loop antenna 1 formed in the resin substrate (rigid substrate) 2, the magnetic sheet 3 having a one-layer structure (only a part of the magnetic sheet 3 has a two-layer structure) is arranged and the magnetic substance (the second layer 3c) having a two-layer structure is arranged only on the outside of the antenna. Note that the outside of the antenna is surrounded by the magnetic sheet (the second layer 3c) 3 that is the upper layer, across the whole circumference.

Also in the structure of the seventh modification, by forming the magnetic substance of the outside of the antenna so as to have a two-layer structure, a reduction in size can be achieved as compared with enlargement of the magnetic sheet 3 in the plane direction, and a reduction in weight can be achieved as compared with the magnetic sheet 3 having a whole two-layer structure.

Next, eighth and ninth modifications of the second embodiment will be described.

Figure 39:
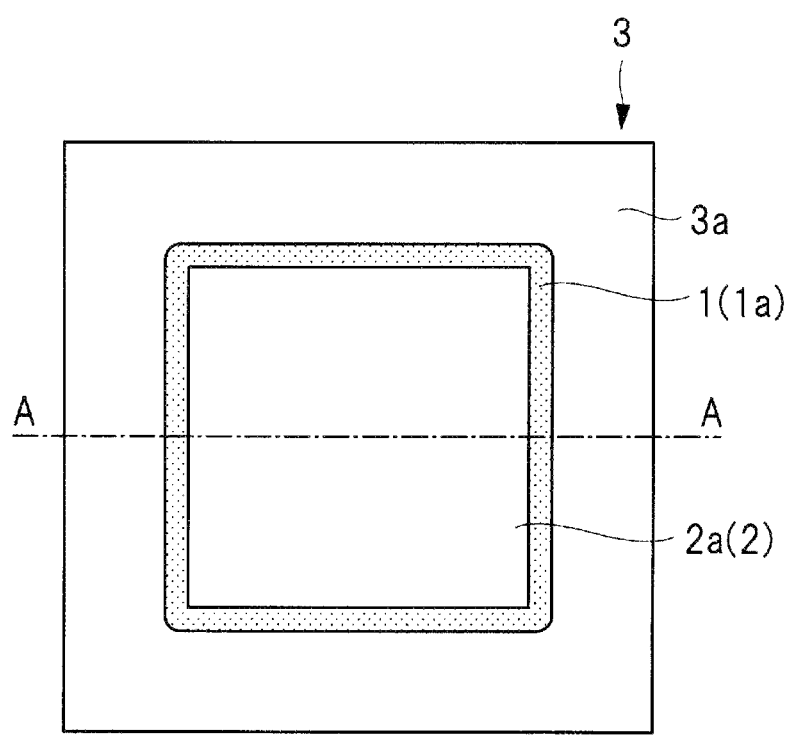
FIG. 39 is a plan view illustrating a structure of a loop antenna and a magnetic sheet of an eighth modification of the second embodiment.
Figure 40:
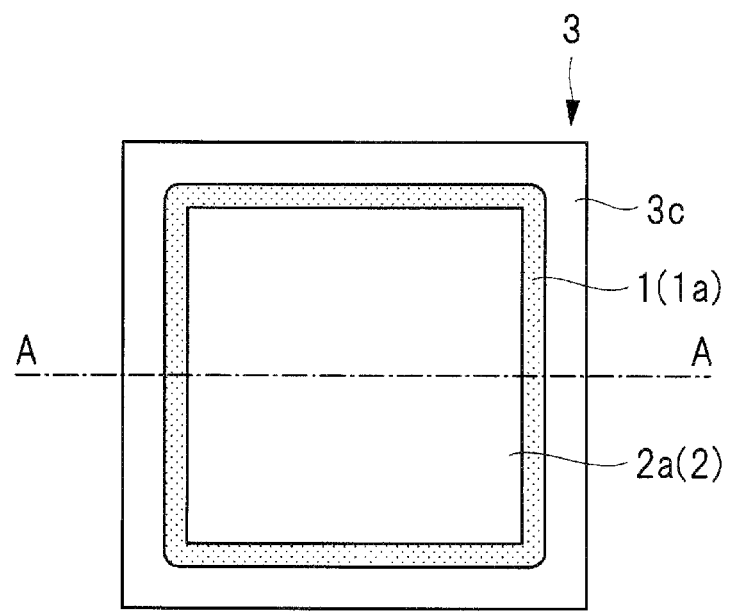
FIG. 40 is a plan view illustrating a structure of a loop antenna and a magnetic sheet of a ninth modification of the second embodiment.
Figure 41:
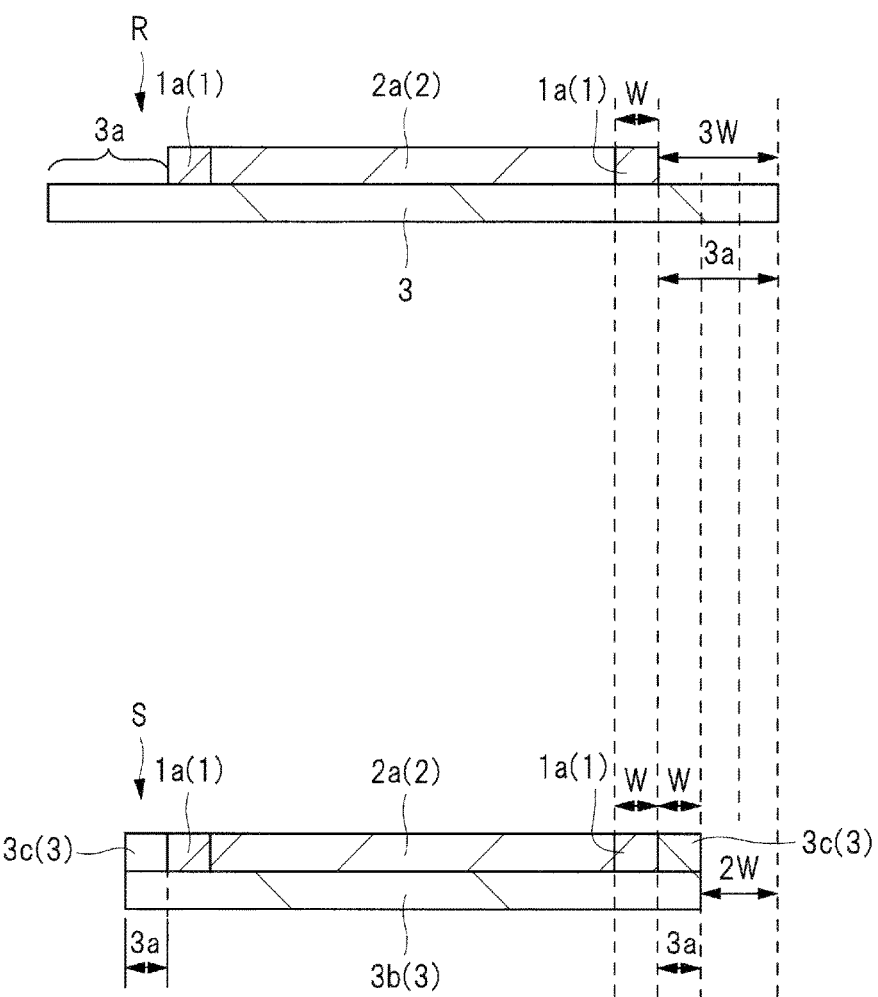
FIG. 41 shows cross-sectional views illustrating a structure of a cross section cut along an A-A line illustrated in FIG. 39 and an A-A line illustrated in FIG. 40, respectively.

FIG. 39 is a plan view illustrating a structure of a loop antenna and a magnetic sheet of the eighth modification of the second embodiment, FIG. 40 is a plan view illustrating a structure of a loop antenna and a magnetic sheet of the ninth modification of the second embodiment, and FIG. 41 shows cross-sectional views illustrating a structure of a cross section cut along an A-A line illustrated in FIG. 39 and an A-A line illustrated in FIG. 40, respectively.

The eighth modification of FIG. 39 illustrates a structure in which the magnetic sheet 3 having a one-layer structure is arranged under the loop antenna 1 formed in the resin substrate 2, and as illustrated in an R structure of FIG. 41, the protruding amount of the protruding portion 3*a* of the magnetic sheet 3 is twice the wiring width W of the antenna, preferably three times (3W), with respect to the wiring width W of the antenna.

On the other hand, the ninth modification of FIG. 40 illustrates a structure in which the magnetic sheet 3 having a one-layer structure (only a part of the magnetic sheet 3 has a two-layer structure) is arranged under the loop antenna 1 formed in the resin substrate 2, and the magnetic substance (the second layer 3*c*) having a two-layer structure is arranged only on the outside of the antenna. Note that the outside of the antenna is surrounded by the magnetic sheet (the second layer 3*c*) 3 that is the upper layer, across the whole circumference.

In the structure illustrated in FIG. 40, as illustrated in an S structure of FIG. 41, the protruding amount of the protruding portion 3*a* of the magnetic sheet 3 corresponds to the wiring width W of the antenna, with respect to the wiring width W of the antenna.

Accordingly, the size of the magnetic sheet 3 having the structure illustrated in FIG. 40 is smaller by twice the wiring width W (by 2W) across the whole circumference of the antenna, as compared with the size of the magnetic sheet 3 having the structure illustrated in FIG. 39.

Namely, the size of the magnetic sheet 3 can be reduced per side in a plan view by twice the wiring width W of the antenna (by 2W), by also arranging the magnetic sheet 3 under the loop antenna 1 and also beside (outside) the antenna wiring.

Note that, in the S structure of FIG. 41, the width of the magnetic sheet (the second layer 3*c*) 3 arranged in the same layer as the antenna and arranged therebeside is set to W, but it is possible to further reduce the width W of the magnetic sheet 3 as long as there is no influence on the efficiency between antennas and the like.

Next, tenth and eleventh modifications of the second embodiment are described.

Figure 42:
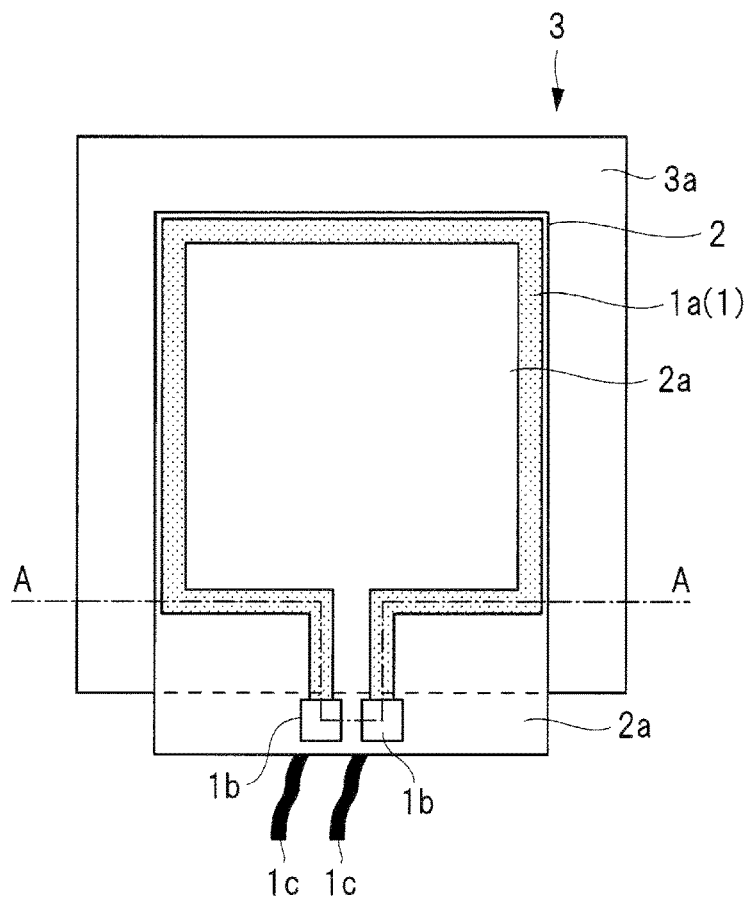
FIG. 42 is a plan view illustrating a structure of a loop antenna and a magnetic sheet of a tenth modification of the second embodiment.
Figure 43:
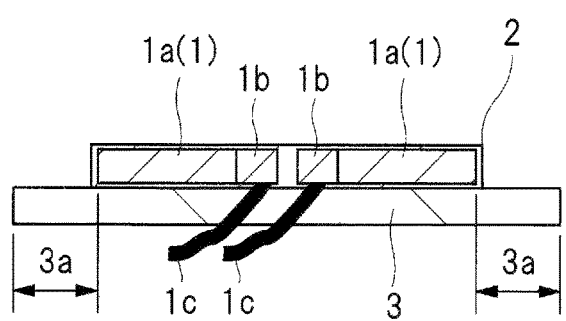
FIG. 43 is a cross-sectional view illustrating a structure of a cross section cut along an A-A line illustrated in FIG. 42.
Figure 44:
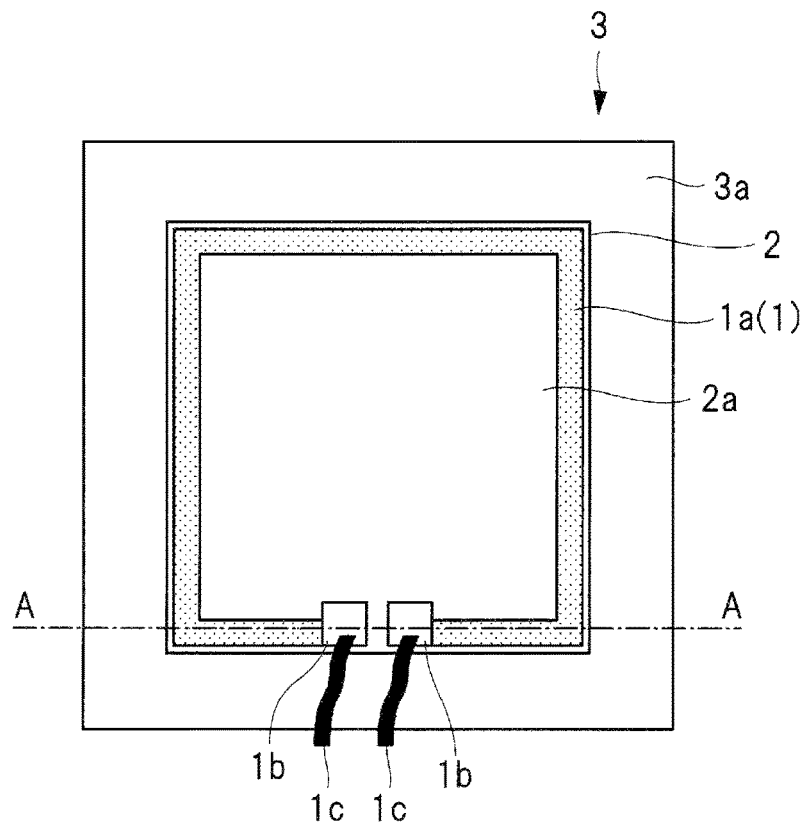
FIG. 44 is a plan view illustrating a structure of a loop antenna and a magnetic sheet of an eleventh modification of the second embodiment.
Figure 45:
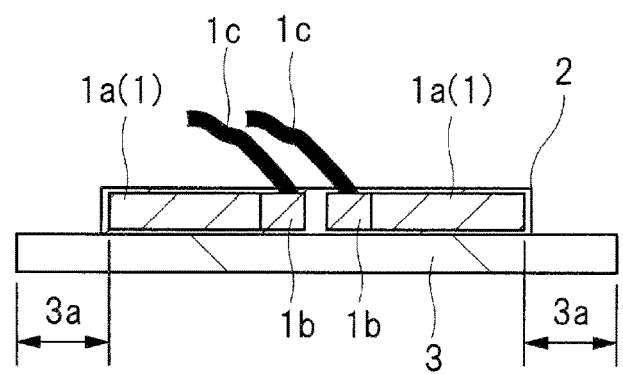
FIG. 45 is a cross-sectional view illustrating a structure of a cross section cut along an A-A line illustrated in FIG. 44.

FIG. 42 is a plan view illustrating a structure of a loop antenna and a magnetic sheet of the tenth modification of the second embodiment, FIG. 43 is a cross-sectional view illustrating a structure of a cross section cut along an A-A line illustrated in FIG. 42, FIG. 44 is a plan view illustrating a structure of a loop antenna and a magnetic sheet of the eleventh modification of the second embodiment, and FIG. 45 is a cross-sectional view illustrating a structure of a cross section cut along an A-A line illustrated in FIG. 44.

The tenth modification in FIG. 42 and FIG. 43 illustrates a structure in which the magnetic sheet 3 having a one-layer structure is arranged under the loop antenna 1 formed in the resin substrate 2. This structure corresponds to, for example, the case where the wiring substrate (see FIG. 20) 12 to which the loop antenna 1 is coupled is arranged on the magnetic sheet 3 side. Here, an antenna pad 1*b* to which the loop antenna 1 is coupled is provided in the resin substrate 2 so as to protrude from the magnetic sheet 3, and an antenna wire 1*c* is coupled to the antenna pad 1*b*. In particular, the antenna pad 1*b* is provided in a portion protruding from the magnetic sheet 3 of the resin substrate 2.

Thus, even when the magnetic sheet 3 is arranged between the loop antenna 1 and the above-described wiring substrate 12, the antenna wire 1*c* coupled to the loop antenna 1 and the antenna electrode of the wiring substrate 12 can be coupled.

The eleventh modification in FIG. 44 and FIG. 45 illustrates a structure in which the magnetic sheet 3 having a one-layer structure is arranged under the loop antenna 1 formed in the resin substrate 2, and this is, for example, the case where the wiring substrate (see FIG. 20) 12 to which the loop antenna 1 is coupled is flatly arranged together with the loop antenna 1 and the magnetic sheet 3. In this case, the antenna pad 1*b* to which the loop antenna 1 is coupled can be provided inside the region of the magnetic sheet 3 (above the magnetic sheet 3), and the antenna wire 1*c* is coupled to the antenna pad 1*b*.

In the case of this structure, the antenna pad 1*b* is not required to be provided so as to protrude from the magnetic sheet 3, unlike the structure illustrated in FIG. 42, and the structure of the loop antenna 1 or resin substrate 2 can be made simpler and thus a reduction in size can be achieved in mounting the resin substrate 2.

Next, a twelfth modification of the second embodiment will be described.

Figure 46:
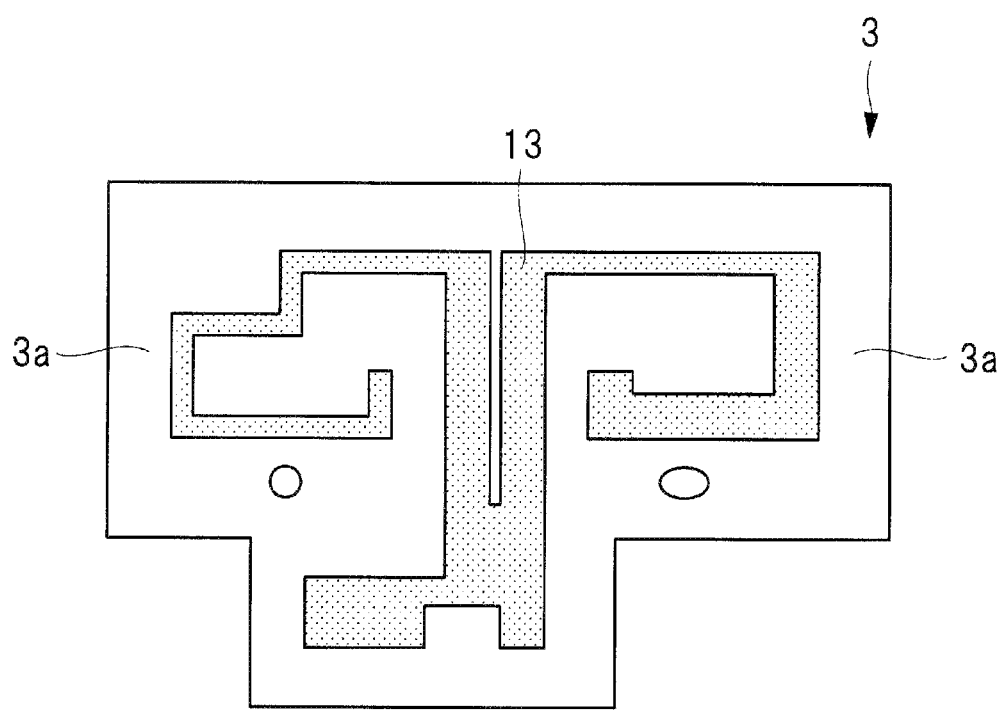
FIG. 46 is a plan view illustrating a structure of a loop antenna and a magnetic sheet of a twelfth modification of the second embodiment.

FIG. 46 is a plan view illustrating a structure of a loop antenna and a magnetic sheet of the twelfth modification of the second embodiment.

The twelfth modification of FIG. 46 illustrates a modification of the shape of the antenna. The antennas of the first and second embodiments are not limited to the loop-shaped loop antenna 1. The antenna of FIG. 46 is a non-loop antenna 13 whose shape in a plan view differs from the loop shape. Even in the case of the non-loop antenna 13 whose shape differs from the loop shape, the magnetic sheet 3 is arranged thereunder, and the size of the magnetic sheet 3 in a plan view is set larger than the size 7 of the non-loop antenna 13 in a plan view.

Then, the protruding amount from the outer peripheral portion of the non-loop antenna 13 of the magnetic sheet 3 is set to be twice or more the width (wiring width) of the non-loop antenna 13, preferably three times or more.

Alternatively, the thickness of the magnetic sheet 3 is 100 μm or more and 650 μm or less.

In this way, a path for magnetic fluxes can be secured inside the magnetic sheet 3, by setting either the size or the thickness of the magnetic sheet 3, or the both thereof within the above-described range. Therefore, a reduction of the noise in the wireless power supply system of the electronic device for communication 22 illustrated in FIG. 15 mounted with the non-loop antenna 13 can be achieved, and electric power can be supplied to the electronic device for communication 22.

The present invention made by the present inventor has been described specifically according to the above-described embodiments. However, it is needless to say that the present invention is not limited to the embodiments, but various modifications are possible without departing from the purport of the invention.

For example, although the description of the antenna wire 1*c* coupled to the antenna bodies 1*a* described in FIG. 42 to FIG. 45 and also the description of all the antenna bodies 1*a* of the loop antenna 1 and the non-loop antenna 13 described in the first and second embodiments are omitted for convenience of explanation, the antenna pad 1*b* is provided in each of the loop antenna 1 and the non-loop antenna 13 and the antenna wire 1*c* is coupled to the antenna pad 1*b*.

Furthermore, the number of turns of the loop antenna 1 and non-loop antenna 13 described in the first and second embodiments may be one, or may be two or more.

Moreover, a combination of modifications can be applied within a range not departing from the scope of the technical ideas described in the above-described embodiments.

What is claimed is:

1. An electronic device for communication, the electronic device comprising:
    an antenna that forms an electromagnetic field;
    a communication circuit coupled to the antenna;
    a metallic part, at least a part of the metallic part including a metal member, and
    a magnetic sheet arranged between the antenna and the metallic part, the magnetic sheet including a protruding portion that protrudes outside an outer peripheral portion of the antenna,
    wherein, with the outer peripheral portion of the antenna as a base point, a protruding amount from the base point of the protruding portion of the magnetic sheet is twice or more a width of a wiring of the antenna,
    wherein the metallic part includes a rectifier circuit that rectifies a signal obtained via the antenna, and
    wherein a material of a side of the magnetic sheet that faces the antenna has a magnetic loss less than a material of a side of the magnetic sheet that faces the metallic part.

2. The electronic device for communication according to claim 1, wherein the antenna comprises a loop antenna.

3. The electronic device for communication according to claim 2, wherein the loop antenna is formed by the wiring in a resin substrate.

4. The electronic device for communication according to claim 2, further comprising a battery pack disposed on the magnetic sheet.

5. The electronic device for communication according to claim 2, wherein the metallic part comprises a substrate including a wiring formed in the substrate.

6. The electronic device for communication according to claim 5, wherein a part of the magnetic sheet is arranged in a position inside a loop shape of the loop antenna.

7. The electronic device for communication according to claim 6, wherein the magnetic sheet includes a two-layer structure.

8. The electronic device for communication according to claim 6, wherein a through-hole penetrating from a front surface to a back surface is formed in the magnetic sheet.

9. The electronic device for communication according to claim 7, wherein the rectifier circuit is formed in the substrate,
    wherein the magnetic sheet includes a first layer part arranged on a side of the loop antenna and a second layer part arranged on a side of the substrate,
    wherein a magnetic loss of the first layer part is smaller than a magnetic loss of the second layer part,
    wherein a size of the first layer part in a plan view is larger than a size of the antenna, and
    wherein the second layer part is arranged corresponding to a position of the rectifier circuit.

10. An electronic device for communication, the electronic device comprising:
    an antenna that forms an electromagnetic field;
    a communication circuit coupled to the antenna;
    a metallic part, at least a part of the metallic part including a metal member; and
    a magnetic sheet arranged between the antenna and the metallic part, a size of the magnetic sheet in a plan view is larger than a size of the antenna,
    wherein a thickness of the magnetic sheet is 100 μm or more and 650 μm or less,
    wherein the metallic part includes a rectifier circuit that rectifies a signal obtained via the antenna, and
    wherein a material of a side of the magnetic sheet that faces the antenna has a magnetic loss less than a material of a side of the magnetic sheet that faces the metallic part.

11. The electronic device for communication according to claim 10, wherein the antenna comprises a loop antenna.

12. The electronic device for communication according to claim 11, wherein the loop antenna is formed by a wiring in a resin substrate.

13. The electronic device for communication according to claim 11, further comprising a battery pack disposed on the magnetic sheet.

14. The electronic device for communication according to claim 11, wherein the metallic part comprises a substrate including a wiring formed in the substrate.

15. The electronic device for communication according to claim 14, wherein a part of the magnetic sheet is arranged in a position inside a loop shape of the loop antenna.

16. The electronic device for communication according to claim 15, wherein the magnetic sheet includes a two-layer structure.

17. The electronic device for communication according to claim 15, wherein a through-hole penetrating from a front surface to a back surface is formed in the magnetic sheet.

18. The electronic device for communication according to claim 16, wherein the rectifier circuit is formed in the substrate,
    wherein the magnetic sheet includes a first layer part arranged on a side of the loop antenna and a second layer part arranged on a side of the substrate,
    wherein a magnetic loss of the first layer part is smaller than a magnetic loss of the second layer part,
    wherein a size of the first layer part in the plan view is larger than a size of the antenna, and
    wherein the second layer part is arranged corresponding to a position of the rectifier circuit.

19. An electronic device for communication, the electronic device comprising:
    an antenna that forms an electromagnetic field;
    a communication circuit coupled to the antenna;
    a metallic part, at least a part of the metallic part including a metal member; and
    a magnetic sheet arranged between the antenna and the metallic part, the magnetic sheet including a protruding portion that protrudes outside an outer peripheral portion of the antenna,
    wherein, with the outer peripheral portion of the antenna as a base point, a protruding amount from the base point of the protruding portion of the magnetic sheet is twice or more a width of a wiring of the antenna,
    wherein the metallic part includes a rectifier circuit that rectifies a signal obtained via the antenna,
    wherein magnetic losses of opposing sides of the magnetic sheet that face the antenna and the metallic part, respectively, are different,
    wherein the rectifier circuit is formed in a substrate of the metallic part,
    wherein the magnetic sheet includes a first layer part arranged on a side of the antenna and a second layer part arranged on a side of the substrate, and
    wherein a magnetic loss of the first layer part is less than a magnetic loss of the second layer part.

20. The electronic device for communication according to claim 19, wherein a size of the first layer part in a plan view is larger than a size of the antenna, and
   wherein the second layer part is arranged corresponding to a position of the rectifier circuit.

* * * * *